(12) United States Patent
Hinderling et al.

(10) Patent No.: US 9,791,272 B2
(45) Date of Patent: Oct. 17, 2017

(54) SURVEYING DEVICE

(71) Applicant: Hexagon Technology Center GmbH, Heerbrugg (CH)

(72) Inventors: Jürg Hinderling, Marbach (CH); Jochen Scheja, Heerbrugg (CH); Charles Leopold Elisabeth Dumoulin, Balgach (CH); Claudio Iseli, Au (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 728 days.

(21) Appl. No.: 14/251,301

(22) Filed: Apr. 11, 2014

(65) Prior Publication Data

US 2014/0307252 A1    Oct. 16, 2014

(30) Foreign Application Priority Data

Apr. 12, 2013    (EP) ..................................... 13163545

(51) Int. Cl.
*G01B 11/26*    (2006.01)
*G01C 1/00*    (2006.01)
(Continued)

(52) U.S. Cl.
CPC ......... *G01C 15/006* (2013.01); *G01C 15/002* (2013.01); *G02B 3/14* (2013.01); *G02B 26/004* (2013.01); *G02B 26/0875* (2013.01)

(58) Field of Classification Search
CPC ...... G01C 15/006; G01C 15/002; G02B 3/14; G02B 26/004; G02B 26/0875
See application file for complete search history.

(56) References Cited

U.S. PATENT DOCUMENTS 6,873,407 B2    3/2005 Vogel
RE39,874 E    10/2007 Berge et al.
(Continued)

FOREIGN PATENT DOCUMENTS

CN    201892533 U    7/2011
CN    202630956 U    12/2012
(Continued)

OTHER PUBLICATIONS

European Search Report dated Sep. 10, 2013 as received in Application No. EP 13 16 3545.

*Primary Examiner* — Samantha K Abraham
(74) *Attorney, Agent, or Firm* — Maschoff Brennan

(57) ABSTRACT

Some embodiments of the invention may relate to an optical surveying device having a base for setting up the surveying device and a targeting unit, which is rotatable in relation to the base about two axes, and which defines a target axis or targeting a target object to be surveyed. In some embodiments, the targeting unit has a first beam path for emitting optical radiation in the direction of the target object to be surveyed and a second beam path for receiving a component of the optical radiation, which is reflected from the target object, by way of an optoelectronic receiving element. In some embodiments, at least one of the beam paths, has an optical element, which is implemented having an optically transparent, deformable volume body, and which has at least one interface toward a medium having an optical index of refraction deviating from the volume body.

19 Claims, 10 Drawing Sheets

(51) Int. Cl.
  *G01C 15/00* (2006.01)
  *G02B 3/14* (2006.01)
  *G02B 26/00* (2006.01)
  *G02B 26/08* (2006.01)

(56) References Cited

U.S. PATENT DOCUMENTS

| | | | |
|---|---|---|---|
| 2006/0066836 A1* | 3/2006 | Bridges | G01B 11/024 356/5.13 |
| 2008/0247606 A1* | 10/2008 | Jelinek | G06K 9/00604 382/115 |
| 2010/0079750 A1* | 4/2010 | Koehler | G02B 27/0025 356/251 |
| 2010/0295987 A1* | 11/2010 | Berge | G02B 3/14 348/360 |
| 2011/0080477 A1 | 4/2011 | Trenary et al. | |
| 2012/0026596 A1 | 2/2012 | Berge et al. | |
| 2012/0063000 A1 | 3/2012 | Batchko et al. | |
| 2012/0127455 A1 | 5/2012 | Sharp | |
| 2012/0224164 A1* | 9/2012 | Hayashi | G01C 15/002 356/3 |

FOREIGN PATENT DOCUMENTS

| | | |
|---|---|---|
| EP | 1043602 A1 | 10/2000 |
| EP | 1081459 A1 | 3/2001 |
| EP | 1311873 A1 | 5/2003 |
| EP | 1450128 A1 | 8/2004 |
| EP | 1684084 A | 7/2006 |
| EP | 1757956 A1 | 2/2007 |
| EP | 1 791 082 A | 5/2007 |
| EP | 1882959 A1 | 1/2008 |
| EP | 2009468 A1 | 12/2008 |
| GB | 2353862 A | 3/2001 |
| JP | 03-748112 A | 3/1995 |
| JP | 04-843128 A | 11/2000 |
| WO | 2006/063739 A1 | 6/2006 |
| WO | 2007/079600 A1 | 7/2007 |
| WO | 2008/037787 A2 | 4/2008 |
| WO | 2008/095923 A1 | 8/2008 |
| WO | 2010/148525 A1 | 12/2010 |
| WO | 2011/141447 A1 | 11/2011 |
| WO | 2012/033892 A1 | 3/2012 |
| WO | 2012/035026 A1 | 3/2012 |
| WO | 2012/058656 A1 | 5/2012 |
| WO | 2012/156277 A1 | 11/2012 |

* cited by examiner

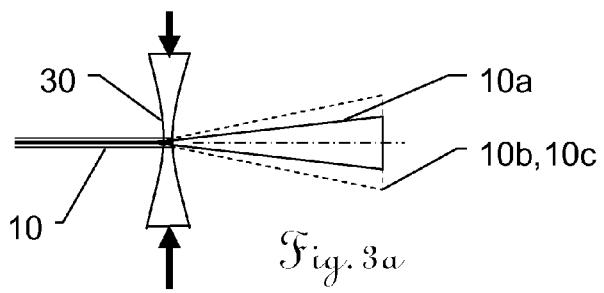
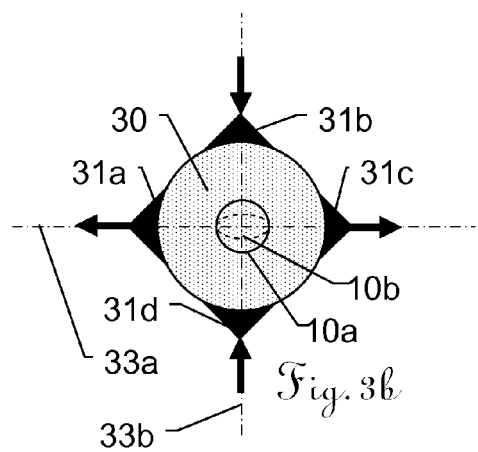 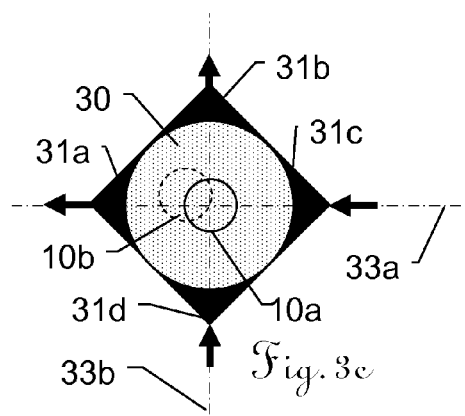
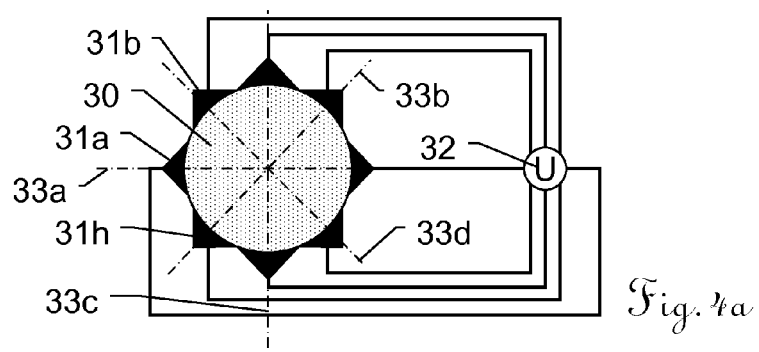
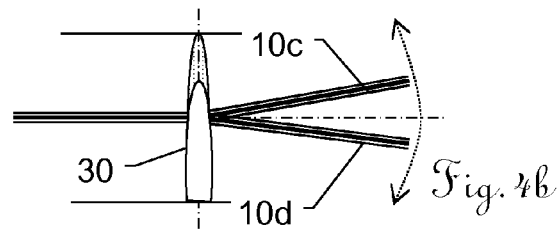

SURVEYING DEVICE

FIELD OF THE INVENTION

Background

Devices of surveying technology operate in various forms on the basis of optical measuring systems. Examples of surveying devices according to the type are disclosed, for example, in U.S. Pat. No. 6,873,407, CN 201892533, US 2011/080477, EP 1 081 459, US 2012/127455, WO 2012/033892, WO 2007/079600, WO 2010/148525, or others.

In general, optical radiation is emitted from these devices in the direction of a target object to be surveyed, of which a distance and an angular location—i.e., polar coordinates of the target object—are determined, which are usually further processed thereafter. From the target object to be surveyed, a component of the emitted radiation is reflected in this case to the device, received therein, and converted into an electrical signal for the distance determination. In addition to the surveying of naturally provided targets, special target markers or reflectors can also be attached to the target object or, for example, a mobile surveying rod can be used as a target object.

The emitted optical radiation can be used here for electro-optical distance measurement on the basis of a runtime or phase measuring principle or a combination of these principles, as this is described, for example, in EP 1 757 956, JP 4 843 128, EP 1 311 873, EP 1 450 128, EP 1 882 959, EP 1 043 602, WO 2006/063739, or others.

The emitted optical radiation can also be used for the recognition and/or angle surveying of a target object. For example, a target mark can be implemented, for example, in the form of a retroreflector or as a visual feature of the target object, for example, a corner, edge, boundary of a contrast surface, etc., as described in WO 2011/141447 or EP 1 791 082, for example. Pulsed or continuously emitted optical radiation can be emitted by the surveying device to assist the recognition of the targets in the field of vision. Such recognition and/or surveying of a target object in angular coordinates can be performed using a position-sensitive optical receiving element in the device, for example, using a planar sensor in CCD or CMOS technology, a PSD based on the lateral photoelectric effect, or an arrangement of one or more photoreceptors, for example, photodiodes, bi-cells, quadrature diodes, etc.

For angle determination, the surveying devices are usually equipped with one or more angle meters or goniometers, with which the device or parts thereof can be rotated for the targeting and an angular location can be determined here. The angle surveying of the target can be performed using the angle meter analysis by exact targeting of the target object using a target axis of the device. However, especially in the case of suitable cooperative targets for this purpose, imprecise targeting of the target object can also be performed within a field of vision of an optoelectronic angle measuring unit (ATR) of the device using the angle meters. By determining the deviation from ideal targeting within the field of vision, the angle meter measured value is subsequently corrected by this deviation. Such a method is described, for example, in JP 3 748 112 or GB 2 353 862. In the surveying devices, the movements about the axes of rotation of the angle meters can be performed manually and/or in a motorized manner.

For the distance and/or angle determination, respectively separate radiation or shared radiation emitted by the device can be used.

It is known that in distance meters, a changeover of the divergence of the emitted measuring beam from a broad emission angle for cooperative reflector targets toward a collimated measuring beam for reflector-free measurements can be applied to natural surfaces of target objects. For example, this can be performed by pivoting a lens into the beam path or other optical means with the same result. Document US 2012/0224164 discloses an optical distance measuring device, in which a changeover of the cross-sectional area of the emitted measuring radiation can be performed. In one of the embodiments, a liquid lens having focal length which can be changed over is used for the beam width changeover.

In addition to the above-described measuring optical systems, a camera recording of a visual image of the target object for the user for operation or for documentation of the measurement can also be performed in the surveying devices. By means of electronic image processing, functions, such as edge recognition, target recognition, feature extraction, automatic execution of predefined measuring programs, touchscreen operation, remote operation, live image transmission, recording, etc., can be executed. In addition to these electronic means for image recording for the user, a classic visual transmitted light channel can also be provided for observing the target object which is aimed at.

So-called RIM (range imaging modules) are also known, which carry out a recognition of a plurality of pixels with associated items of distance information, i.e., a three-dimensional target object recognition in the form of a point cloud. An example of this is described, for example, in EP 1 684 084. The achievable distance and angle resolutions, and also the achievable precisions are not sufficient in many cases, however, especially for precision measurements, for example, in geodetic applications.

In geodesy, as a frequent field of application of the present invention, high levels of measurement precision are required, both in the angle determination and also in the distance determination. For example, in the field of land surveying, tachymeters or total stations are used, which have distance measurement precisions of several millimeters or also less than 1 mm. Measuring ranges of several kilometers in the case of reflector measurements or several hundred meters in the case of reflector-free measurements are required, respectively. The precision of the angle measurements is usually in a range less than 2 to 10 arc seconds, preferably at 1 arc second, 0.5 arc second, or less. These requirements are made more difficult by the fact that such surveying devices are often used in rough surroundings having strongly changing environmental conditions, such as temperature, ambient humidity, etc.

To achieve the required high levels of precision, high precision in the device production is necessary, especially in the alignment of the components in the optical path.

One important criterion is represented by the precision and stability of the alignment of the target line, especially the target line of the distance meter or the target line of the automatic target direction measuring device (ATR) in relation to the target axis of the targeting unit.

However, the optical paths in the device interior also become more and more complex due to the incorporation of more and more functionalities into the surveying device. Surveying devices can have, for example, beam paths for distance measurement, visible pilot beams, automatic target recognition, automatic target alignment, transparent observation, overview cameras, zoom functions, image recording, target lighting, optical data communication, internal reference sections, etc. Not only is the device design made difficult by the high number of the optical components required, but rather also the alignment of all respectively participating components to one another, which is to be carried out during the production, proves to be more difficult and more complex. The probability also increases with the number of the components that one of these components can be misaligned by internal or external influences and thus the device loses precision.

An incorporation of additional, in particular movable components into the surveying device can be detrimental to its measurement precision and stability, because of which simplification of the beam path, reduction of the component number, and avoidance of movable parts such as mirror scanners are to be sought.

SUMMARY

Some embodiments of the invention may improve the measurements using a surveying device.

Some embodiments of the invention may improve and automate measuring methods already known in the prior art, and also to provide novel measuring functionalities to the user.

An improvement of the alignment retention and therefore the measurement precision of the surveying device is also disclosed.

Some embodiments of the invention may simplify the surveying device in its construction or, in other words, to provide a surveying device which is implementable more simply and cost-effectively, i.e., has a lower component and installation expenditure, for example, without this restricting the achievable measurement precision.

Some embodiments of the invention may provide a surveying device which is producible in highly integrated form and has the fewest possible parts—especially as few as possible parts which are movable and/or are to be aligned with high precision.

Some embodiments of the invention may configure the alignment during the installation of the device simpler or to avoid the necessity of an exact alignment of optical components during the production and/or calibration of the device.

Some embodiments of the invention may provide the user the possibility during use of the measuring device to allow a precise alignment of the target lines assigned to the measuring units of the surveying device on location, i.e., also in the field, for example, to correct deviations which are ascertained in the scope of a two-location measurement physically and not only solely numerically.

Some embodiments of the invention may achieve an improvement or simplification of the targeting of a measuring target during an angle and/or distance measurement.

Various embodiments described herein may be jointly implemented in one surveying device.

An optical surveying device according to the invention is described hereafter, for example, a tachymeter, laser scanner, laser tracker, a total station, or the like. The device has a base for setting up or stationing the surveying device and a targeting unit, which is rotatable in relation to the base about two axes, which are provided with angle meters. The targeting unit defines a target axis for targeting a target object to be surveyed (or a measuring point on the target object, respectively), which is rotatable about the two axes. The targeting unit has a first beam path for emitting optical radiation in the direction of the target object to be surveyed, in particular in polar coordinates, and a second beam path for receiving a component of the optical radiation, which is reflected from the target object, by way of an optoelectronic receiving element.

According to the invention, at least one of the beam paths has an optical element, which is designed as having an optically transparent, deformable volume body which has at least one interface toward a medium having an optical index of refraction deviating from the volume body.

The interface is deformable by means of multiple electrical activation signals in such a manner that thus the optical refraction properties of the element are differently variable in at least two non-coincident directions.

In particular, the directions are at least approximately orthogonal to an optical axis of the optical element. In one embodiment, the optical element can be implemented as a liquid lens and the deformable volume body can be formed by a liquid, the interface of which is deformable by means of electrical activation signals.

In particular, at least one of the beam paths has, for example, an optical element in the form of a liquid lens, which is implemented as an element having an optically transparent liquid, which has at least one interface toward a medium having an optical index of refraction deviating from the liquid. The interface is deformable by means of multiple electrical activation signals in such a manner that the optical refraction properties of the element are thus differently variable in at least two non-coincident directions.

In particular, the interface is deformable in such a manner that the optical refraction properties of the element are thus variable in three dimensions, namely longitudinally and in two directions transverse to the beam direction. In one case, a curvature of the interface is variably settable in that the lens is uniformly activated. In another case, the curvatures of the interface are varied differently in at least two non-coincident directions. In a further case, the centers of curvature are displaced differently in at least two non-coincident directions.

With the number of the activators (for example, in the form of activating actuators or electrodes), the number of performable setting possibilities which can be carried out on the liquid lens also increases, and therefore the degree of influence and change of the optical wavefront of the beam passing through the lens also increases. The wavefront components which deviate from a predefined sphere or plane are of interest in particular. Such deviations, which are often referred to as wavefront aberrations, can be represented, for example, as a series expansion of Zernike polynomials. The coefficients of the series expansion respectively assigned to the polynomials provide information about the strength of the respective influence. By way of suitable electrical activation of the electrodes, the coefficients can also subsequently be selectively varied according to the invention in the case of a liquid lens installed fixedly in the device.

In the simplest case, by means of the electrical activation, for example, the coefficient for the polynomial which influences the focus or those coefficients which cause a wedge effect for a transverse beam deflection is/are changed. Focus variations are settable, for example, in a range from −40 dpt to +50 dpt and beam deflections are settable by wedge effect, for example, in a range of +/−5°. The above-mentioned adjustment ranges of the liquid lens can be scaled appropriately as needed by means of additional optical systems connected upstream and/or downstream from the liquid lens.

The transverse directions assigned to the wedge effects are at least approximately in the element plane of the liquid lens, i.e., in other words in a plane which is at least approximately orthogonal to the optical axis of the liquid lens (in the non-activated state). These directions can especially divide the main axis cross-section of the lens body into segments of at least approximately equal size.

The first and/or second beam path can be assigned, for example, to an optoelectronic distance meter and/or an automatic target search, target recognition, target detection, or target tracking of the surveying device. Especially, the first beam path can be a laser target line of an optoelectronic distance meter and the second beam path can be a receiving channel of the distance meter.

To achieve beam shaping and/or beam deflection in a measuring device having a laser light source, known approaches such as micro-mirror arrays in MEMS technology (for example, DLP) or lattice structures are not directly applicable. These cause visible lattice structures in the beam or beam distortion and/or worsened divergence, for example, due to bendings of the micro-mirrors or uneven activation behavior of the individual mirrors. Without further measures, the presently known micro-mirror MEMS are unsuitable for the field of application of laser surveyings.

Exemplary embodiments of liquid lenses from the prior art are found, for example, in US 2012/0063000 or in the references cited therein. Such liquid lenses have been especially developed for portable cameras, such as video or photo cameras, webcams, mobile telephone cameras or tablet PC cameras, etc. Lenses have also been developed which also allow, in addition to a variable focal length for focusing, optical image stabilization (OIS). Examples of this are found in WO 2012/035026, WO 2008/037787, US 2010/0295987, US 2012/0026596, EP 2 009 468, or U.S. RE39,874. In the present invention, however, the liquid lenses are not used for the original purpose thereof, of optical image recognition of the target object, i.e., for the imaging part, but rather for the radiometric, i.e., the surveying part of the device.

In the case of liquid lenses, there are greatly varying activation and functional principles, for example, electrowetting, piezo-actuators, magnetic actuators, capacitive actuators, thermal actuators, etc. All of these share the feature that the optical property changes of the liquid lens are induced or controlled by an electrical activation signal.

Instead of lenses in which the optical beam refraction is based on the displacement of liquids, lenses having amorphous polymers in the rubber-elastic state can also be used. The materials used here are used above the glass transition temperature, so that they are elastically deformable. A transparent membrane can be provided as a delimitation between two such deformable media. For example, lenses according to the invention can also be implemented using a material enclosed in a rubber-elastic envelope, which consists of a material that is transparent (in the spectral range of interest) and extensible, for example, polyethene.

The term liquid lens is thus to be understood here as an optical element having a volume body deformable in a targeted manner by actuators, in which using deformability of the interfaces, which is activatable in a targeted manner, of an optically active volume body, the optical refraction properties of the element are variable in a defined manner. For example, this is a polymer lens deformable in a targeted manner by actuators or a liquid lens in the classic meaning, for example, as it is produced by Varioptic S.A.

According to the invention, the surveying device has a control unit for manipulation of at least one volume body, which is deformable in a targeted manner by actuators. For example, the surveying device has at least one volume body, which is deformable in a targeted manner by actuators and is implemented as a lens, and which has at least three actuators arranged in a distributed manner along its circumference, which are activatable by the control unit in such a manner that the optical refraction properties of the element are differently variable in at least two non-coincident directions.

If the optical element is a liquid lens having liquid volume body, this thus comprises, for example, an optically transparent chamber having a first and a second optically transparent medium, wherein the first and the second medium are non-miscible and have different optical indices of refraction. The media which respectively form a volume body can be, for example, an aqueous, alcoholic, or oily liquid, a polymer in the liquid state, a silicone, or a silicone oil. An interface is provided between the first and the second medium, wherein the interface is deformable by the actuators, so that the optical refraction properties of the liquid lens are differently variable in at least two non-coincident directions. Alternatively, a thin, transparent membrane can also be provided between the two media.

For example, the optical element can also be implemented as a polymer lens deformable in a targeted manner by actuators, wherein it then comprises an optically transparent volume body having an optically transparent medium in one embodiment. The volume body is closed at least on one side using a thin, transparent membrane, which consists, for example, of a polymer in the elastically deformable or rubber-elastic state. The membrane comprises a central region, which represents a lens body, and also a peripheral region, which has a reservoir having optically transparent medium, wherein the elastic properties of the membrane or the thickness thereof can be different in the various regions. The membrane is manipulable by the actuators in such a manner that the content of the reservoir is displaceable into the lens body and out of the lens body into the reservoir. In this manner, the optical refraction properties of the polymer lens are differently variable in at least two non-coincident directions. Another type of the polymer lens can be implemented using a polymer membrane which is changed in the curvature thereof in a manner activated by actuators in order to set the refraction properties. The material of such a polymer lens can be selected from the group comprising, for example, polyethylene glycol dimethacrylate (PEGDM), hydroxyethyl methacrylate (HEMA), copolymers of PEGDM and HEMA, hydrogel, silicone, soft silicone, polysiloxane, polyethylene, polypropylene, modified polystyrene, or polyurethane.

A particularly suitable form for a deformable volume body made of rubber-elastic material is, for example, a meniscus lens, since in the case of meniscus lenses, a well-controlled change of the two lens radii can be caused using radial forces. Since the material thickness of the volume body remains unchanged in a first approximation in all zones or incidence heights, the radii of curvature assigned to the two surfaces change differently upon the application of radial forces, whereby—in accordance with the lens maker formula—the refractive power of such an elastic element is also varied. Meniscus lenses also have the advantage of a small spherical aberration in the case of different deformations, since the meniscus shape can be maintained over the entire setting range. The selection and in particular the establishment of the Shore hardness of the lens material is substantially established by the size and dimension of the volume body to be deformed. One possible material having low Shore A hardness (DIN 53505) would be a silicone-type casting compound such as Wepesil VT3601E (Shore A hardness: 45), a material having moderate Shore A hardness in the form of a casting resin would be, for example, polyurethane Wepuran VT 3404 (Shore A hardness: 50).

There are greatly varying activation and functional principles for the volume body, which is deformable in a targeted manner by actuators, for example, electro-wetting, piezo-actuators, magnetic actuators, capacitive actuators, thermal actuators, etc. The changes of the optical properties of the interfaces, which are deformable in a targeted manner by actuators, of the volume body are caused either directly or indirectly by electrical activation signals, which are generated by the actuators.

The liquid lenses according to the present invention thus also include other settable lens elements as described, in which the refraction properties can be carried out by a shape change which is dynamically activatable during operation, in particular electrically, of interfaces.

Since surveying instruments and measuring devices are used in greatly varying setups, stationings, and device locations or are also pivoted in the scope of the surveying, the elements in the surveying instrument are to be as gravitation-independent as possible, so as to avoid an additional gravitation-dependent readjustment of the liquid lens activator, which would otherwise be necessary. Therefore, in many embodiments of measuring devices, gravitation-invariant components are preferred in the optical path, which maintain the properties thereof independently of the spatial location and gravitational direction thereof. One example of a gravitation-free liquid lens—thanks to equal liquid densities—is found, for example, in WO 2008/095923.

A target line modification can be carried out using the liquid lens, which is provided with the transversely variable refraction properties, in the surveying device according to the present invention. This is understood to mean that a beam path of the surveying device 11 is modified through the liquid lens. This target line modification can respectively be performed statically in the surveying device—i.e., unchanged over long periods of time after a first setting or with no or only a very slight chronological change rate—and/or dynamically—i.e., chronologically changing, for example, cyclically or periodically—as this is described in detail hereafter. Furthermore the static target line modification is also referred to hereafter as "beam alignment" and the dynamic target line modification as "beam steering". According to the invention, the listed modifications can respectively be caused alone or in any arbitrary combination with the liquid lens.

The beam alignment can be used to form static target line modifications, for example, for calibration purposes i.e., for example, for a self-aligning surveying device. An automatic target line stabilization is thus performed in a manner of speaking. Therefore, for example, the high demands during manufacturing and alignment of the device can also be partially reduced, since the liquid lens according to the invention in the surveying device is capable of compensating for (especially smaller) misalignments. This can be performed automatically by the electrical activation and a set of associated calibration parameters can be stored, which can be retrieved again during every power-up and can be set on the liquid lens. Thermal drifts can also be compensated for using a previously determined calibration table, for example. Especially since several alignment errors can also be determined by the two-location measurement in the field, the respective required static liquid lens setting can also be ascertained in the field and in accordance with the currently existing environmental conditions. In order to cope with the possible device flaws, a liquid lens according to the invention is necessary, which not only permits a simple focal length adjustment, but rather which is deformable in such a manner that thus the optical refraction properties of the liquid lens are differently variable in at least two non-coincident directions, especially in at least two directions in a plane normal to the optical axis of the liquid lens. In particular, the directions can divide the lens cross-sectional area into segments of at least approximately equal size.

Using an optional recognition of the point of incidence of the emitted optical radiation on the target object, for example, in a camera image, the laser target line can be visualized and active stabilization of the location thereof can be caused in the form of a control loop. In addition to the location, other target line parameters such as spot size on the target, beam shape, etc. can also be regulated. For regulation with feedback, however, a recognition within the device of the emitted light can also be applied after the liquid lens, wherein optionally internal (parasitic) mirror effects on lenses, residual transmission on beam deflection elements, etc., can also be used. In addition to dedicated optical position-sensitive elements, such as a PSD, a quadrature diode, or one or more PIN diodes as actual value generators, for example, those reflections can also be guided on unused pixels of a camera already provided for another purpose, for example. Feedback in the form of a determination of the current lens shape on the liquid lens itself, for example, by capacitive sensors, is a further possibility for implementing active regulation of the liquid lens. In addition, the item of distance information of a distance measuring module can also be incorporated in a control loop for the liquid lens activation, to ensure tracking of the focusing of the measuring beam on the target object.

In addition to the most targeted possible alignment of the distance measuring target line on the target axis of the surveying device, targeted and controlled deviation from this condition can also be advantageous in the case of various measurement applications. Examples of such target line modifications according to the invention using liquid lenses are provided hereafter.

Due to the different deformability of the liquid lens in multiple directions, both a setting of the beam divergence or beam convergence and also a direction change of the emitted optical radiation can be achieved. In other words, upon observation of the propagation direction of the emitted beam bundle, an optical wedge effect which is settable in two dimensions is more or less achieved. The present invention even goes beyond this, however, in the case of the target line modifications—which are performable using the liquid lens according to the invention in the surveying device—as the further examples of target line modifications according to the invention show.

For example, a liquid lens can be applied in a surveying device in the form of a laser scanner, as is described in international application number PCT/EP 2012/058656. In the scope of the calibration method explained therein, a liquid lens used according to the invention can be used in the surveying device for active error compensation. The target line modifications according to the invention using the liquid lens can be used to compensate for target line errors. Due to the highly dynamic activation ability of liquid lenses, this can even be performed during scanning operation, i.e., for example, a variable axis adaptation and/or an autofocus within one rotation of the scanner. Because of the device-specific construction of a scanner, the liquid lens is advantageously attached in the device body, i.e., it only rotates about one of the two axes.

For example, if an object is surveyed using a laser scanner over greater distances, the deflection mirror for the measuring radiation thus rotates further during the time of flight (TOF) of the light pulse, whereby the field of vision (FOV) of the receiver also pivots. In the case of rapid scanning movements and/or large distances, this aspect must be considered in the design of the optical field of vision of the receiver, for example, in that the field of vision is enlarged with respect to angle, for example, by an enlarged circular aperture to ensure that the light pulse is still in the range of the FOV and therefore can be received at the end of the time of flight (with deflection mirror correspondingly rotated further). A larger field of vision has the disadvantage, however, that more ambient light will be collected and the measuring signal is worsened by shot noise. For this purpose optomechanical derotators are a known solution. The set of the measuring pulses reflected from the object and arriving at the receiving aperture at least approximately describes a circular path. By means of a Dove prism, the rotational movement on the circular path can be imaged or transformed at least into a stationary polar angle segment, whereby the receiving aperture can be implemented as slots and smaller than without activation compensation measures. In the case of the use according to the invention of a liquid lens in the beam path of the distance meter, the circular path described by the pulse set can be transformed back onto the optical axis of the receiver. This can be achieved by the liquid lens activating synchronously to the movement of the scanner deflection, i.e., for example, to the rotation of the deflection mirror. Especially, a liquid lens in the receiving beam path can be activated for this purpose in such a manner that its optical refraction properties are varied differently in at least two non-coincident directions (especially in at least two directions in a plane perpendicular to the optical axis of the liquid lens), so that the reception beam is always incident through a small (for example, circular) aperture on the receiver and therefore the field of vision of the receiver can be selected to be small and less ambient light is captured. The liquid lens thus compensates for or reduces the previously described circular path, preferably to one spot.

While employing a liquid lens used according to the invention in the surveying device, the target line modifications can be carried out, without complex mechanisms and movable parts being used and the beam path in the device being further complicated. Rather, the beam path is simplified and the required components in the distance meter and also the component alignment are simpler, since many inaccuracies can be compensated for by the liquid lens, which is adjustable differently in multiple directions, by appropriate activation.

According to the invention, the requirements for the factory calibration and assembly precision can be significantly relaxed in some regions with the aid of the liquid lens, since using the construction according to the invention, many errors can be detected and—if necessary—also compensated for in the field, i.e., during the operation or a preceding stationing and calibration. For example, using a known two-location measurement, an axis error can be established in the field and this can be compensated for by appropriate activation of the liquid lens. All current environmental conditions are also taken into consideration. The liquid lens permits a direct adaptation of the optics and actual removal of the error and not only a numeric compensation of existing errors, without mechanical interventions in the device being required for this purpose.

The reduction caused according to the invention of the number of components also helps to improve the precision, especially the long-term stability and robustness of the surveying device.

Furthermore, using the liquid lenses according to the invention, imaging errors can also be remedied in surveying instruments. For example, in the case of small-volume instruments, the beam paths are often simultaneously folded and focused using a hollow mirror, wherein aberrations of the optical wavefront arise in the event of an off-axis arrangement of this mirror. By means of a liquid lens having multiple activators, for example, in the form of activation electrodes placed on the outer regions of the lens, such higher-order aberrations can be compensated for. For example, astigmatism or also coma in the horizontal and vertical transverse directions may be changed by different control voltages on the electrodes and thus corresponding system errors of the beam path can be corrected, without a mechanical alignment of the position of optical elements in the instrument being necessary.

The beam steering can be used for dynamic—i.e., chronologically rapidly changing—target line modifications, for example, for scanning or target tracking. The liquid lens is dynamically activated so as to achieve an intentional deviation from the target axis, i.e., in other words scanning of a target region using the distance meter.

Several exemplary applications, such as measuring edges and corners, and surface inclination determinations, are explained hereafter.

A further example of a dynamic target line modification is represented by dynamic path tracking of a moved target object. In the prior art, this is performed solely via the servo-axes of the device, which are usually designed more for precise rapid movements. A tachymeter or theodolite having ATR function can indeed track moving targets, even if the telescopic alignment is not ideally aligned to the moving target point, however, the EDM often has an excessively small field of view (FOV), so that signal interruptions occur again and again. By means of the liquid lens according to the invention for target line modification, on the one hand, the FOV of the distance measurement can be varied. For this purpose, for example, a liquid lens can also be used in the reception beam path of the EDM. On the other hand, a direction control of the EDM target line within the larger FOV of the ATR can be performed, i.e., the distance meter can be quasi-aligned on the target object, without the relatively sluggish target axis of the device tracking the rapid target movements. The device axes only track the target object slowly and coarsely, while the more rapid movements are tracked with the aid of the liquid lens(es). It is thus possible to survey 3-D coordinates in the case of path tracking without signal interruptions.

In addition to the above-described modes of operation, a beam alignment according to the invention using the liquid lens can also be performed as a further static target line modification, as a variation of the focus or the beam divergence of the target line. Using appropriate activation of the liquid lens, in particular by an activation which causes an at least approximately symmetrical deformation of the interfaces in the two directions, a focal length change of the emitted radiation will be performed. Therefore, for example, by way of a changed convergence in the near field (less than approximately 30 m), near field shading of the measuring radiation can be avoided by a coaxial beam path, i.e., a so-called radiometric near field optic can be implemented in an automatic and freely configurable manner. The emission divergence in the case of reflector measurements—for example, using prism targets—can also be selected to be larger than in the case of reflector-free measurements, in which a focused beam having lesser divergence is preferably used. Using the liquid lens according to the invention in the surveying device, this can be performed in the scope of a target line modification, without mechanically moved parts being necessary, such as pivot lenses from the prior art.

By means of the focal length change, during a measurement of reflective target marks, the strength of the reception signal can also be set in a certain range. For example, the beam divergence can be changed in inverse proportion to the increasing distance, the light spot on the reflector thus has a constant diameter. The irradiance on the reflector can thus be kept at least approximately constant, whereby the signal strength on the receiver also remains at least approximately equal (the atmospheric transmission which is neglected here can optionally also be taken into consideration). The signal dynamics, which is to be managed by the receiving electronics, can thus be substantially reduced and/or the absolute distance measurement precision can be improved.

In addition to the emission of the lowest divergent possible beam for the reflector-free distance measurement, focusing of the beam on the target object can also be carried out as a type of autofocus function, which can be used not only for improved visibility of the target point or higher signal intensity in the EDM, but rather also allows a higher point resolution due to the smaller measuring point, for example, during the preparation of point clouds using a tachymeter or a laser scanner. To set the focal length, the result of the distance measurement can be raised. Using this target line modification, a user can specify a desired diameter of the target point of the distance meter on the target object, for example, during the measurement or between two measurements, for example, to cope with special surveying tasks or geometries of the target object.

As further static target line modifications by the liquid lens, in the case of emission of two wavelengths for distance measurement, whether optionally (e.g., IR or visible) or jointly (IR with visible pilot beam for target line visualization), an alignment of the respective optical axes or compensation for different divergences can be caused using one or more liquid lenses. Therefore, for example, there are the laser diodes, which are known in the prior art, having two emission zones for different wavelengths, which are very close to one another, are also usable, since the two channels can be optically placed together using the liquid lens. Therefore, for example, a divergent IR beam for cooperative target objects or a collimated visible beam for reflector-free targets can be emitted, wherein the changeover and the ensuring of the same target line alignment is achieved using the liquid lens used according to the invention in the surveying device.

A further special feature of a target line modification which can be carried out according to the invention using the liquid lens is represented by a compensation of different divergence axes of semiconductor lasers. Thus, a static target line modification in the form of beam bundle shaping of different divergence angles of the optical radiation emitted by a semiconductor laser is performed using the liquid lens. According to the present invention, this may be compensated for by the different deformability of the liquid lens in multiple directions. Residual astigmatism of laser diodes can thus be remedied and the light spot on the target object can thereby be shaped less elliptically and typically also smaller, whereby the irradiance on the target object also becomes greater.

If two liquid lenses are used at a specific distance to one another, further beam shaping possibilities thus result. Due to the flexible activation ability of the deformation of a lens pair, for example, the elliptical beam bundle of a laser diode can be transformed into a round bundle. The semiconductor laser diode can thus be installed in almost any arbitrary orientation in the device. Also, no optical elements have to be mechanically aligned thereafter, but rather, with the aid of the liquid lens(es), the alignment can first be performed in connection with the device assembly, during the setting of the factory settings, or even later in the field.

A further static variation by the liquid lens can be performed in the form of a deflection of at least a part of the generated measuring radiation onto a reference path within the device of known length, to carry out a calibration of the distance measuring functionality. Using the liquid lens, a variation of the component of the radiation which is deflected via the internal path can be carried out as a target line modification, without movable mechanical parts in the device being necessary for this purpose.

The above-described modes of operation of the beam alignment which can be carried out according to the invention using the liquid lens in the surveying device can also be applied for a further dynamic target line modification not known in the prior art. Using the liquid lens in the surveying device, for example, a transmitter-side light mixer can be implemented for smoothing the modulation wavefront (FRD) of the distance meter in a simple manner. The FRD can be improved by laser beam mixing using a dynamically moved liquid lens, especially if the refraction properties of the liquid lens can be modified differently in two or more different directions according to the invention. In addition, a high dynamic response or bandwidth of the modification can also be achieved using liquid lenses. This dynamic target line modification is advantageously applicable not only in the case of the distance measuring radiation emitted from the surveying device but rather also in the case of emitted ATR radiation.

A dynamic deformation of the liquid lens according to the invention in the surveying device, which occurs during the emission of the measuring and/or ATR radiation, can also be applied to suppress speckles influences. For this purpose, very slight changes of the refraction properties of the liquid lens often suffice, i.e., only slight deformations of the interface thereof. This can be carried out at correspondingly high frequencies—if necessary also superimposed with the other target line modifications described here. For example, a periodic, minimal change of the angle deflection of the liquid lens, i.e., shaking of the emitted beam, or a slight variation of the focal length, i.e., respiration of the focusing, can be carried out. More complex deformations of the lens interface may also be carried out to cause such an effect using the multiply activatable liquid lenses.

A further application according to the invention of a liquid lens can occur in the reception beam path of an ATR module, in which variable focusing of the image sensor on the target object or target, for example, a retroreflective tape target as a retroreflective film for attachment to the target object, can be carried out using the liquid lens. If a triple prism is used as an ATR target, the focusing can accordingly be performed to twice the distance to the target. In the prior art, the reception beam path of an ATR having a fixed focus optic is set to infinite, which results in fuzzy imaging of the light spot on the image sensor or PSD of the ATR in the near field, in particular in the case of tape targets, however, whereby the direction measurement becomes imprecise. Using a liquid lens according to the invention in the reception beam path of the ATR, at least approximately sharp imaging of the ATR target can be achieved, especially also in the near field. If one or more liquid lenses according to the invention are differently variable in at least two directions in the ATR reception beam path, therefore, for example, the field of vision of the ATR receiver can also be displaced horizontally or vertically, for example, in order to scan a larger region horizontally and/or vertically for targets without axis movements. Furthermore, a zoom function of the reception channel of the ATR can be achieved using the liquid lenses according to the invention, for example, to ascertain a coarse location of the target in a first activation of the liquid lens having a larger field of vision, to aim at this location coarsely if necessary by pivoting the device axes, and subsequently to carry out a precise determination of the target location in a known manner in a second activation of the liquid lens using a smaller field of vision than previously.

BRIEF DESCRIPTION OF THE DRAWINGS

The method according to the invention and the device according to the invention will be described in greater detail hereafter solely as examples on the basis of concrete exemplary embodiments, which are schematically shown in the drawings. Further advantages of the invention will also be discussed here. In the individual figures:

FIGS. 3a, 3b, and 3c show a first exemplary sketch of target line modifications according to the invention using a liquid lens in the surveying device;

FIGS. 4a and 4b show a second exemplary sketch of target line modifications according to the invention using a liquid lens in the surveying device.

DETAILED DESCRIPTION

Figure 1:
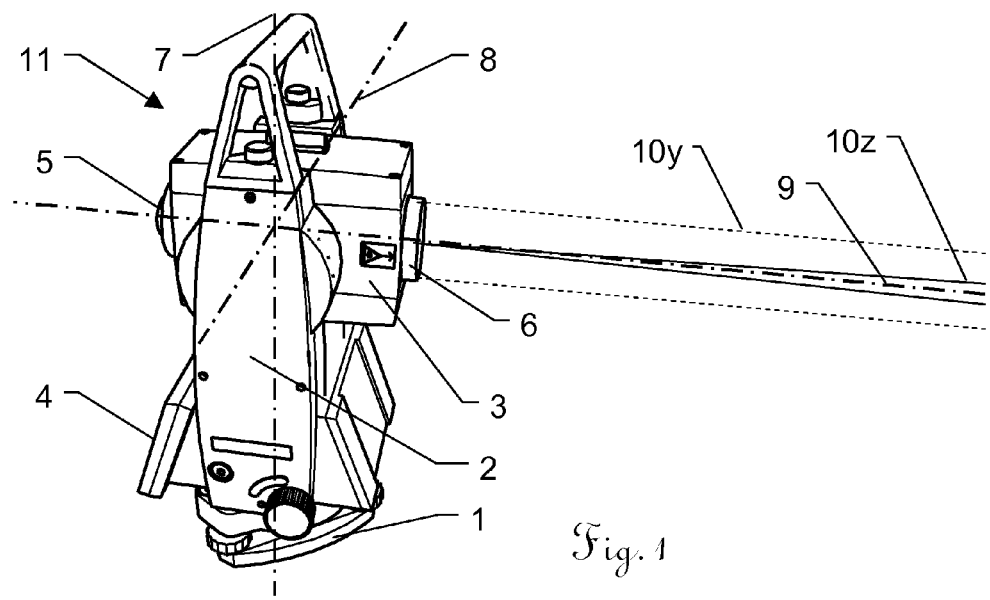
FIG. 1 shows an example of an embodiment of a surveying device in the definition of the present invention.

FIG. 1 shows an example of a surveying device 11, in which the present invention is applied. The device 11 has a base 1, using which it is stationed for surveying purposes, for example, using a tripod (not shown here). A device body 2 of the device 11 is attached to the base 1, having a vertical goniometer rotatable around a standing axis 7. The base 1 has units for the horizontal leveling of the device 11—or in other words for the perpendicular adjustment of the standing axis 7, for example, with the aid of three adjustment screws and a circular level and/or an electronic level. The device body 2 has an operating unit 4 and is connected to the targeting unit 3 by a tilt axis goniometer, which is rotatable about the tilt axis 8. In the case shown, the targeting unit 3 has a telescopic sight having an objective 6 and having an ocular 5, i.e., it is equipped with a transparent light channel. Other embodiments can also have, additionally or alternatively to the optical telescope, a digital ocular and/or a screen display on the operating unit 4 or an external control unit. The targeting unit 3 has a target axis 9, which in the ideal case is exactly perpendicular to the tilt axis 8 of the tilt axis goniometer, which is in turn perpendicular to the vertically aligned standing axis 7 of the vertical goniometer. The three axes are thus at least approximately orthogonal to one another and the target axis 9 is movable about two axes in relation to the base. In the direction of the target axis 9, a distance measurement is performed using an optoelectronic distance meter in the targeting unit 3, the optical axis of which corresponds in the ideal case to the target axis 9 as a target line 10z. Any possible errors and deviations from this axis arrangement are considered to be instrument errors, which must be taken into consideration during a measurement to obtain correct results. A plurality of these errors can be established by the so-called two-location measurement, from which calibration parameters for the numeric correction of the measurement results can be determined for further measurements, as is described in detail in the device handbooks.

Therefore, the device 11 can survey a targeted target object in polar coordinates using the two angle meters and the distance meter. The polar coordinates can subsequently also be converted into other coordinate systems or more complex surveying tasks and calculations can be carried out based thereon, which can be carried out in a controlled manner via the operating unit 4, for example, by a digital computer within the device or using an external computer.

The optoelectronic distance meter is embodied coaxially in the example shown, i.e., the beam path of the emitted optical radiation 10z and the beam path of the optical radiation 10y received by the device 11 have an at least approximately shared optical axis, which is also coincident with the target axis 9 in the ideal case. A basic requirement is that it is at least ensured that the optical axis 10y of the receiver is aligned on the target line 10z of the transmitter in such a manner that the field of vision of the receiver registers the light spot of the transmitter on the target object.

The embodiment shown is an optical surveying device 11 having a base 1 for setting up the device 11 and a targeting unit 3, which is rotatable in relation to the base 1 about two axes 7 and 8, which are provided with angle meters. The targeting unit 3 has a target axis 9 for targeting a target object 40 to be surveyed and has a first beam path 10z for emitting optical radiation 10 in the direction of the target object 40 to be surveyed, and a second beam path 10y for receiving a component of the optical radiation 10, which is reflected from the target object 40, by way of an optoelectronic receiving element.

The embodiments of a surveying device according to the invention explained hereafter describe in particular the aspects which are briefly summarized hereafter.

The optical element 30 can have multiple final control elements, which are activated by the electrical activation signals, in particular at least for, preferably eight or more, along the circumference of the volume body. The optical element 30 can be implemented in such a manner that its optical refraction properties are variable in such a manner that a variation of a deflection of the optical axis of the relevant beam path can be carried out by the electrical activation signals, wherein in particular the optical signal can be switched over between a reference path and a measuring path using the variation of the deflection.

Furthermore, the optical element 30 can be implemented in such a manner that its optical refraction properties are variable in such a manner that a variation of an axial focusing of the relevant beam path can be carried out by the electrical activation signals, wherein in particular the focusing is variable between divergent and convergent.

The surveying device 11 can have an optoelectronic distance meter and the beam path which guides the optical radiation of the distance meter can have such an optical element.

The surveying device 11 can have an automatic target detection and the beam path which guides the optical radiation of the target detection can have such an optical element.

The optical element 30 can be arranged in the first beam path, wherein a static and/or dynamic target line modification can be carried out with the variation of the optical refraction properties.

For example, the target axis can be calibrated in its alignment using the static target line modification.

The surveying device 11 can have an optical sensor element for a recognition of a point of incidence of the optical radiation on the target object and a regulation of the activation signals of the optical element can be performed based on an analysis of the sensor element in such a manner that a shape and/or a location of the point of incidence in relation to the target axis corresponds to a setpoint value.

According to the invention, a method for surveying a target object 40 can thus be carried out using an optical surveying device, having setting up a base of the device, targeting the target object using a target axis of a targeting unit by a rotating the targeting unit about two axes, which are provided with angle meters, in relation to the base.

The targeting is performed using emitting of optical radiation along a first beam path in the direction of the target object, and receiving a component of the optical radiation, which is reflected from the target object along a second beam path, by way of an optoelectronic receiving element.

According to the invention, a modification of the first and/or second beam path is performed using a variation of optical refraction properties of an optical element, which is located in at least one of the beam paths, in at least two non-coincident directions. This is performed by different deformation of an interface of an optically transparent deformable volume body toward a medium having an optical index of refraction, deviating from the volume body, in the at least two non-coincident directions, this deformation being controlled by means of multiple electrical activation signals.

The modification can be performed as a static target line modification in the form of beam bundle shaping of different divergence angles of the emitted optical radiation.

The emission of the optical radiation can be performed using at least two wavelengths, in particular one visible wavelength and one non-visible wavelength, for example, using a laser light source, with which the two wavelengths can be emitted by a single component. The modification as a static target line modification can align the optical radiation of the first and/or second wavelength in relation to the target axis.

The modification can in this case be performed as a static target line modification in such a manner that a distance-adapted focusing of the beam path containing the optical element is performed, in particular having a first beam divergence for a non-cooperative target object, which is less than a second beam divergence for a cooperative target object.

The modification can be performed as a static target line modification in such a manner that an adaptation of the focusing of the beam path containing the optical element is performed, so that an irradiance of the optoelectronic receiving element is kept at least approximately constant.

The modification can also be performed as a dynamic target line modification having dynamic variation of the refraction properties, reduction of speckle effects of the optical radiation, and/or smoothing of a modulation wavefront of the optical radiation, in particular having a periodic variation of the refraction properties.

The modification can be performed as a dynamic target line modification using a scanning movement of the beam path in a region about a setpoint target direction to the target object, in particular having an ascertainment of an edge of the target object or an inclination of a surface of the target object in relation to the setpoint target direction by surveying multiple points within the scanning movement.

The modification can be performed as a dynamic target line modification synchronously to a movement of at least one of the axes, in particular wherein the beam path is modified in such a manner that this is aligned by a static receiving aperture on the optoelectronic receiving element.

The present invention also relates to a computer program product having program code which is stored on a machine-readable carrier, or computer data signal, embodied by an electromagnetic wave, for carrying out the method described here, in particular wherein the program code carries out an activation of an optical element for the target line modification in a surveying device according to the invention, especially wherein a target line modification is performed by a regulation with reference to a recognition of the first beam path via the program code.

Figure 2A:
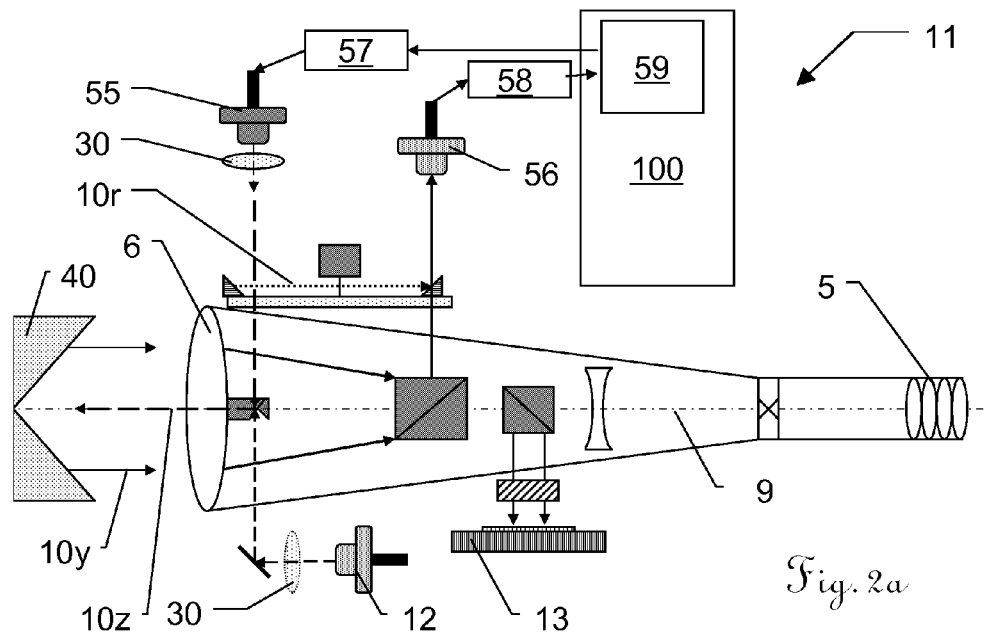
FIG. 2a shows a schematic view of an internal structure of a first embodiment of a surveying device according to the invention.

FIG. 2a shows an example of an internal structure of a first embodiment of a targeting unit 3 of a surveying device 11 according to the invention. The components shown in this example and the arrangement thereof is to be considered to be solely schematic and can also vary in other embodiments or also parts thereof can be omitted, supplemented, or displaced into the device body 2.

The device 11 is equipped as in FIG. 1 with a transmitted light channel, i.e., it has an ocular 5, through which light entering the objective 6 can be observed. Alternatively or additionally, a recording of the observation image can be performed by a camera 13 and an observation of this image can be performed on a monitor or display screen, which can be located in the objective 5, on the device 11, or externally thereto. The optical axis of the observation corresponds in the case shown to the target axis 9 of the device 11, which can be made apparent during observation by a targeting aid, for example, crosshairs or the like.

Furthermore, several essential parts of the optoelectronic distance meter (EDM) are shown. The monitoring unit 100 of the device 11 is connected to the EDM controller 59, which controls the emission of optical measuring radiation by the light source 55 via a driver stage 57. The light source 55 can be embodied as a semiconductor light source, for example, as an LED or as a laser light source in the form of a solid-state laser, a fiber laser, or a semiconductor laser, or a combination thereof. There can be one single light source or multiple light sources in the transmission beam path, which can have, for example, different optical properties, such as wavelengths, polarization, etc. A semiconductor laser element, with which more than one wavelength of light can be emitted, can also be used, as described hereafter.

In the embodiment shown here, a liquid lens 30 according to the invention is provided in the beam path of the emission of the device 11, which is implemented as an element having a liquid which is optically transparent in the wavelength range of the optical signal, and which has at least one interface toward a medium having an optical index of refraction deviating from the liquid. The interface is deformable by means of multiple electrical activation signals in such a manner that thus the optical refraction properties of the element are differently variable in at least two non-coincident directions. In the event of a uniform variation in the at least two non-coincident directions, however, the divergence angle of the traversing radiation can also be set using the liquid lens 30 according to the invention.

A modification of the target line can be performed using the liquid lens. In the case shown, it is that of the distance measurement.

According to the invention, the liquid lens 30 can also be provided, for example, in a beam path of the emission of target illumination radiation, for example, for automatic target recognition (ATR), so as to modify the target line thereof in a similar manner as described in the distance measurement.

Upon the presence of multiple light sources 55, one single or multiple liquid lenses 30 can also be applied according to the invention, in particular to coincide the optical axes thereof or to carry out another of the target line modifications described hereafter in detail. For example, an infrared light source can be provided for distance measurement and a pilot beam in the visible range can be provided for visualizing the IR target line on the target object 40, which can automatically be brought into correspondence by a liquid lens 30 according to the invention using a target line modification, without mechanical alignments being necessary. In the embodiment shown, the beam path of the ATR light source 12 has a liquid lens 30, which is shown by dotted lines, which alternatively or optionally additionally can be provided according to the invention. The above-described one second light source for the target axis visualization is not shown for the sake of comprehensibility.

Furthermore, a reference light component 10r of the measuring radiation is shown, which is guided via a reference section within the device, and which can also be guided, according to the invention in the form of a target line modification using the liquid lens 30, if needed to a measuring light receiver 56.

Since, as described, it is a coaxially constructed distance meter, the beam path of the measuring radiation (and also as shown here the target illumination radiation of the light source 12) is reflected on the optical axis of the objective 6 and therefore on the target axis 9 of the device. As described, deviations can occur in this case, which can be compensated for according to the invention in the form of a target line modification using the liquid lens 30. The measuring light or at least a part thereof is now reflected from the target object 40. In the case shown, the target object 40 is implemented as a retroreflector, however, the target object 40 can also be a natural target, for example, a wall or the like.

The reflected beam path 10y is deflected onto a receiving element 56 (for example, a photodiode) of the EDM, which can be performed via a wavelength-selective deflection, for example. The received light signal is therefore conditioned as an electrical signal in block and a distance from the device 11 to the target object 40 is determined by the distance measuring unit 59, for example, in the form of a runtime measurement, phase measurement, signal shape analysis, or a combination of these principles.

The reception beam path is also deflected onto the camera 13, for example, having CCD or CMOS image sensor, but also or additionally as an RIM sensor, and also to the ocular 5.

Figure 2B:
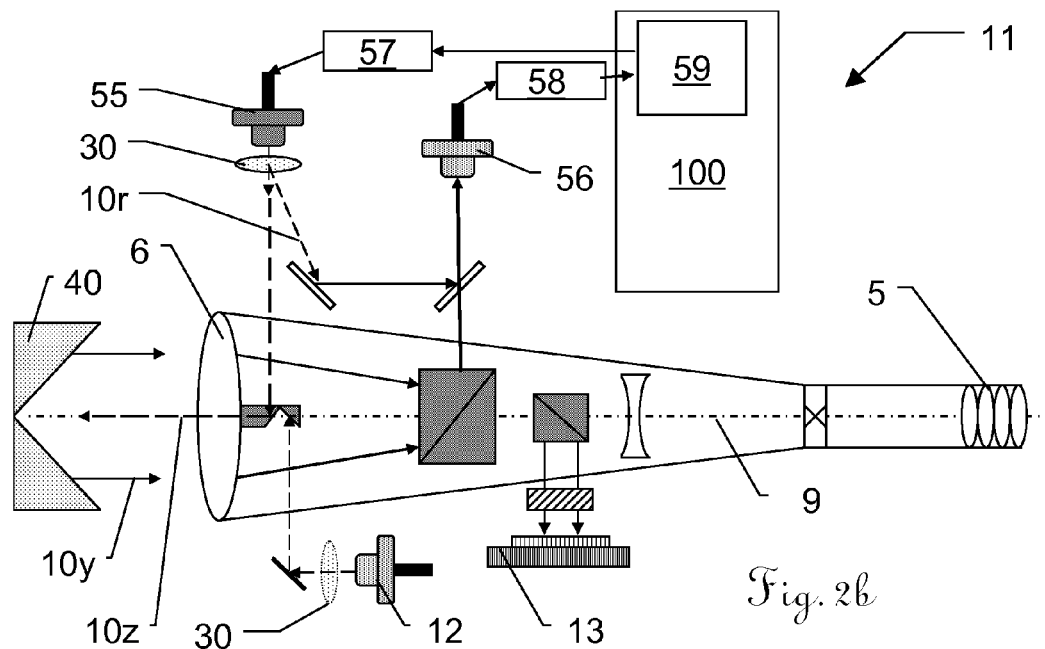
FIG. 2b shows a schematic view of an internal structure of a second embodiment of a surveying device according to the invention.

FIG. 2b shows an example of an internal structure of a second embodiment of a targeting unit 3 of a surveying device 11 according to the invention. In contrast to FIG. 2a, not only can a direction adaptation of the target line 10z be carried out using the liquid lens 30, but rather also a deflection of the transmission beam onto an optical reference path 10r can be performed, for example, using a deflection and coupling mirror shown here.

Figure 2C:
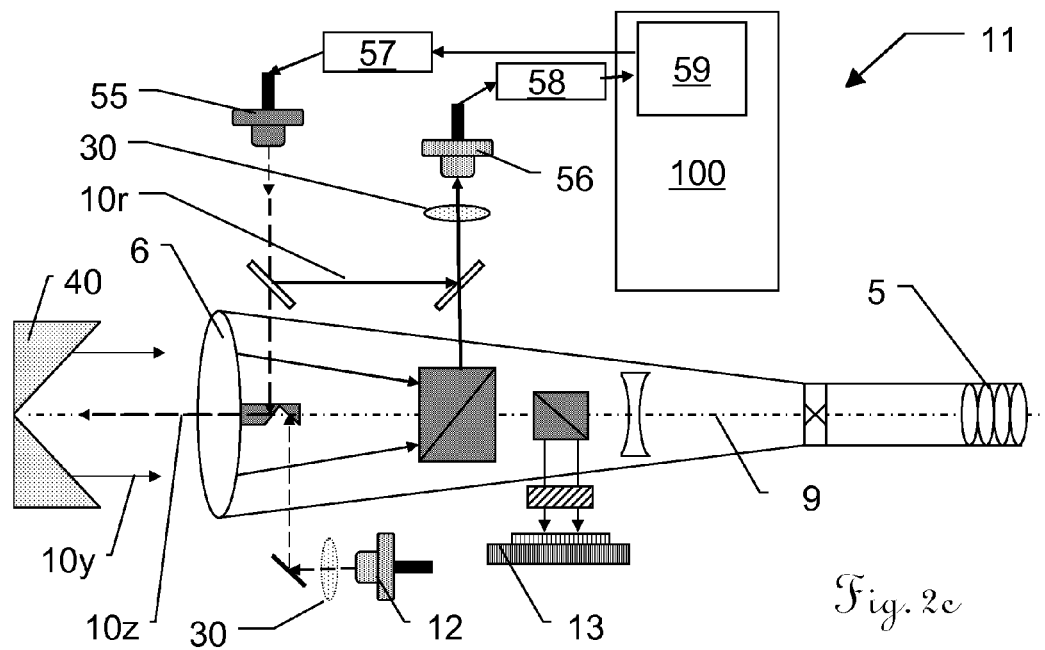
FIG. 2c shows a schematic view of an internal construction of a third embodiment of a surveying device according to the invention.

FIG. 2c shows an example of an internal structure of a third embodiment of a targeting unit 3 of a surveying device 11 according to the invention. In contrast to the previous figures, the liquid lens 30 is arranged here in the receiving channel of the distance meter.

FIG. 3a shows an example of a modification of the optical radiation 10 according to the present invention. An embodiment of a liquid lens 30 is shown, by means of which the optical radiation 10 is varied. In the example shown, an activation-dependent axial change of the transmitted beam occurs (i.e., a focus variation), for example, in that an at least approximately uniform activation is performed along the lens circumference. The proportions of beam diameters to lens diameter are not always shown close to practice in the figures here, especially in the case of practical implementations, a higher level of usage of the liquid lens surface area by the beam cross section can occur.

FIG. 3b shows the liquid lens 30 as an element in a top view in the direction of the optical axis. Four final control elements 31a, 31b, 31c, 31d are symbolized, using which the optical refraction properties of the element are differently variable in the directions 33a and 33b by electrical activation signals. The arrows at the edge symbolize a force action on the liquid in the liquid lens, which induces a deformation of the interface 63g. In the example shown, the beam shape 10a of the optical radiation 10 is changed into the beam shape 10b by the activation, in that a liquid lens body of the liquid lens (30) is deformable by means of multiple electrical activation signals in such a manner that the optical refraction properties are thus variable differently in at least two non-coincident directions. The deflection shown as an example causes different refractive forces in the horizontal and vertical directions. The allocated focal lengths are therefore different, and the lens has an astigmatic effect.

FIG. 3c shows another activation (see arrows), in which the optical axis of the optical radiation 10 is varied in the direction thereof, which is symbolized by the two offset circles 10*a* for the input beam and 10*c* for the output beam. The different variations of the refraction properties occur in the embodiment shown here in the directions 33*a* and 33*b*, which are orthogonal to one another. Direction variations of the deflection of the optical axis of the radiation in a spatial angle segment, i.e., in two spatial directions which are orthogonal to one another, can thus be carried out independently of one another by the activators 31*a*, 31*b*, 31*c*, 31*d*. During this activation, the lens center is displaced up and left from the axis, this causes a wedge effect, the beam is deflected in this direction.

The activation of the liquid lens (30) can be performed by a static control or a dynamic regulation of the activation signals, wherein the activation can be performed by a computer program on a digital computer of a control unit of the surveying device 11.

FIG. 4*a* and FIG. 4*b* show a further embodiment of a liquid lens, which has eight final control elements along the circumference thereof. The four or eight final control elements shown here in the descriptions are to be considered solely as examples and this number can be embodied from three up to substantially higher values, depending on the requirements for the variability and distribution of the refractive power over the free opening of the liquid lens 30.

These final control elements can operate as mentioned above, for example, according to the principle of electro-wetting, a force-induced liquid transport, or other principles, which are explained in the cited literature in particular, wherein the activation finally always occurs electrically. The liquid lens, i.e., the geometrical shape and alignment of an interface 63*g* of a liquid or rubber-elastic lens body is changed, and a rigid lens made of glass or fixed-shape plastic is not displaced or tilted, for example. By way of the multiple final control elements provided according to the invention, the shape of the interface 63*g*—and therefore the refractive power and the distribution thereof—can be varied differently in a controlled manner over the aperture of the element in the different directions 33*a*, 33*b*, 33*c*, and 33*d* of the element plane of the liquid lens 30. Therefore, not only can a focal length adaptation be caused by a circular-symmetrical curvature change of the liquid lens body, but rather the optical radiation can be modified according to the invention in greatly varying ways, as is explained hereafter with reference to the application according to the invention in a surveying device. The electrical activation unit 32 operates the respective final control elements 31*a* to 31*h*, which is shown by the connecting lines. The activators do not necessarily have to be attached in circularly-symmetrical form as segments along the lens edge, as is shown here in simplified form.

The activation of the liquid lens 30 permits the lens—i.e., especially the light-refractive interface 63*g* between two media having different indices of refraction—to be deformed in a controlled manner, wherein according to the invention a different deformation of the interface 63*g* in at least two different directions orthogonal to the optical axis of the incoming radiation—i.e., more or less in the element plane of the liquid lens—is achievable using the multiple activation. By way of suitable electrical activation of the electrodes of the liquid lens, errors in the optical imaging or beam shaping, for example, astigmatism or coma, can additionally be reduced or eliminated. The entire liquid lens as an optical element is not shifted in its position or alignment in the device, however, but rather is fixedly installed. This results in a modifiability according to the invention of a beam path in the surveying device, in particular of a laser target line. Therefore, different refraction properties are controllable in these at least two directions and therefore the optical radiation is modifiable in manifold ways, as is applied according to the invention in the case of the improvement of a surveying device. However, the mechanical device structure is not complicated, but rather in contrast—in comparison to a possible implementation if need be of the same functionalities using other means—can even be simplified and the number of the required components is also less.

In addition to the activation terminals shown, there can also be still further sensor terminals for determining the present lens shape. These can be implemented, for example, as electrodes for the capacitive determination of the current shaping of the lens liquid, for example, as further segments along the lens circumference. In addition to such a direct shape determination of the lens, the current optical refraction characteristic of the lens can also be detected by corresponding sensors.

Figure 5:
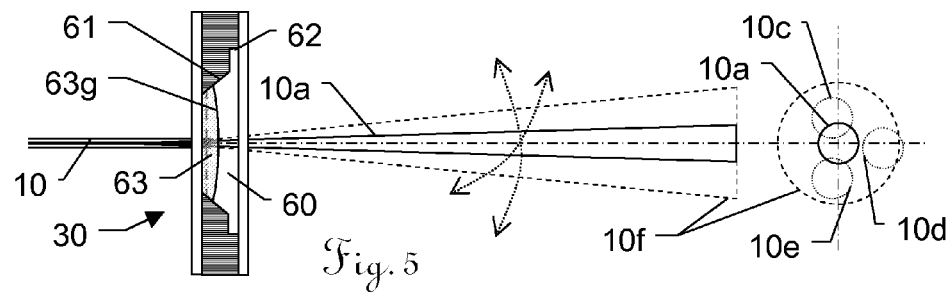
FIG. 5 shows a first exemplary mode of operation of an embodiment of a liquid lens according to the present invention.

FIG. 5 shows a first example of an embodiment of a liquid lens 30, which modifies optical radiation 10 in an optical surveying device according to the invention. On the one hand, the refraction properties can be varied using appropriate activation in such a manner that the beam shape is changed in a controlled manner from 10*a* to 10*f*, i.e., the divergence of the beam bundle is adapted, in that a focal length adaptation of the liquid lens 30 occurs.

On the other hand, the refraction properties of the liquid lens 30 can be varied using appropriate activation in such a manner that the beam direction of the optical axis is deflected in a controlled manner from 10*a* into another spatial direction (as indicated by the base arrows), for example, to 10*c*, 10*d*, 10*e*.

The liquid lens 30 is constructed to be circularly symmetrical and is shown in section here. In this example, the lens body contains two non-miscible liquids 60 and 63, which have different optical indices of refraction, so that the beam path of traversing optical radiation 10 is modified at the interface 63*g* thereof. Alternatively, a thin transparent membrane can also be provided between the two liquids. If the two liquids have at least approximately the same specific density, gravitational influences on the shape of the interface 63*g* can be excluded to a very large extent, which simplifies the applicability thereof especially in the case of surveying devices having rotatable and/or pivotable targeting units, without the liquid lens having to be realigned by the activator depending on the spatial location thereof, in order to keep its properties constant. As mentioned, instead of the liquids (for example, water, oils, alcohols, etc.), polymers in the plastically deformable or rubber-elastic state can also be used (for example, silicone elastomers, silicone rubbers, . . . ). For the activation, the electrodes 61 and 62 are attached, with the aid of which, according to the principle of electro-wetting, the geometric shape of the interface can be varied. In addition to this action principle, however, other activators can be used, in which a deformation of the interface can be caused directly or indirectly by an electrical signal. For example, known principles such as pistons or springs moved by means of magnetic coils can be applied, which change the limiting volume in the outer region of the liquid lens 30. The activator can be divided along the circumference of the liquid lens into multiple segments, which are each individually activatable and by which a non-rotationally symmetric deformation—with respect to the optical axis of the liquid lens—of the interface is producible, so that the refraction properties are variable from those of a classic, ideal lens to a more complex modification of the traversing optical radiation. By way of corresponding activation, using the liquid lens 30 according to the present invention, in addition to a focal length change, for example, an angle deflection of the optical axis of the exiting light, a spherical aberration, astigmatism, coma, or another optical error can also be intentionally introduced or corrected, which will be explained hereafter in conjunction with the usability thereof in the surveying device 11.

Figure 6A:
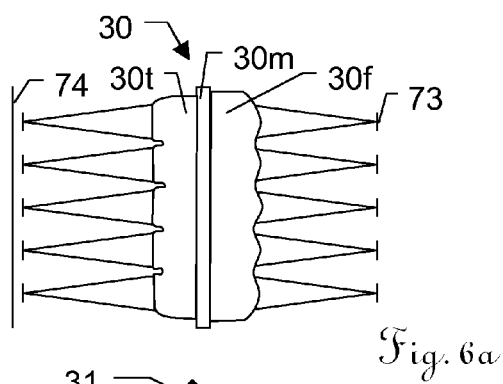
FIGS. 6a, 6b, and 6c show a second exemplary mode of operation of an embodiment of a liquid lens according to the present invention.
Figure 6B:
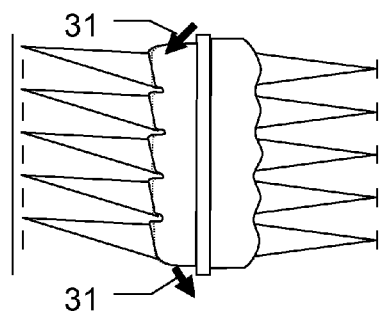
Figure 6C:
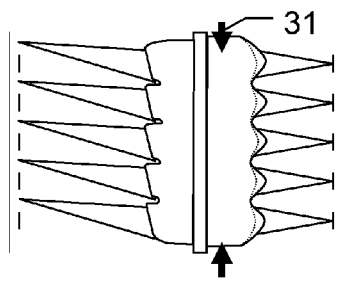

FIG. 6a to FIG. 6c show a second example of an embodiment of a liquid lens 30 for the modification according to the invention of optical radiation 10 in a surveying device in a sectional view. The liquid lens 30 shown can consist, for example, of a two-dimensional matrix of individual elements, which are shown in a row here. The image plane 74 or the object plane 73 is respectively shown on both sides of the liquid lens 30. The liquid lens 30 is constructed from a first liquid part 30t to achieve an optical wedge effect and a second liquid part 30f, which is separated therefrom by a solid middle part 30m, for a focal length adaptation. The liquid lens 30 is divided as shown into individual subsegments, the optical axes of which are illustrated by the triangles shown between lens and image/object plane.

FIG. 6a shows the basic position of the liquid lens 30 without activation. The regions marked with dashes in the image plane and object plane are respectively imaged on one another as shown.

FIG. 6b shows an activation 31 for the angle deflection of the optical radiation by deformation of the first liquid part 30t. The basic position is shown by a dotted line. The angle deflection of the optical axes of the optical radiation is thus caused by the rotated triangles.

FIG. 6c shows an activation 31 for focal length variation of the optical radiation by deformation of the second liquid part 30f. The basic position is shown by a dotted line. The compressed triangles and the closer object plane 73 are thus shown.

In FIG. 6b and FIG. 6c, all subsegments are activated jointly, however, they can also be activated in subgroups or individually, to achieve special modifications of the optical radiation. A combination of the two beam modifications from the two figures can obviously also be carried out.

Figure 7A:
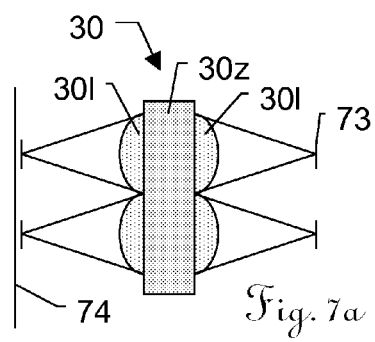
FIGS. 7a, 7b, and 7c show a third exemplary mode of operation of an embodiment of a liquid lens according to the present invention.
Figure 7B:
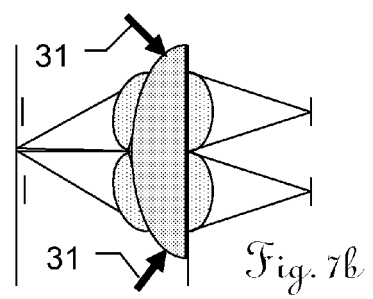
Figure 7C:
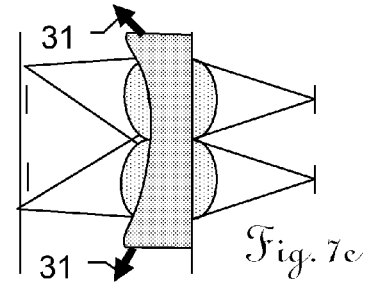

FIG. 7a to FIG. 7c show a third example of an embodiment of a liquid lens 30 for the modification according to the invention of optical radiation 10 in a surveying device in a sectional view. The surface of the actual liquid 30z of the liquid lenses is equipped with optical micro components 301—in the example shown in the form of spherical microlenses—however, other forms can also be used, for example, concentric circles (Fresnel optics) on a membrane containing the lens liquid 301. It can be constructed, for example, from a two-dimensional matrix of the micro-components 301, which are shown in a row here, or in the form of concentric ring structures.

FIG. 7a shows a non-deformed basic position of the liquid 30z without activation, and the beam path resulting therefrom.

FIG. 7b shows a first example of an activation 31, and the modification thus caused of the optical radiation in the form of a shorter focal length.

FIG. 7c shows a second example of an activation 31 in the form of an enlarged focal length.

In addition to these activations 31 shown, still further modifications of the optical radiation 10 are also achievable by other activations 31. The geometric formation of the liquid lenses 30 and the components thereof can also be varied.

Further modifications achievable according to the invention, which can be carried out according to the invention using the liquid lenses in the surveying device, will be explained hereafter.

FIG. 8a to FIG. 8i are examples of target line modifications according to the present invention having the refraction properties differently variable in multiple directions, which can be carried out using a liquid lens 30 in the beam path, to improve the measurement precision, calibration ability, and/or the functionality of the surveying device 11. The target line modification caused in the form of a static beam alignment and/or a dynamic beam steering of the optical radiation 10 emitted from the device 11 can thus be caused using an electrical activation of the liquid lens, without mechanical movements and local displacements of rigid optical components being carried out within the device 11.

Figure 8A:
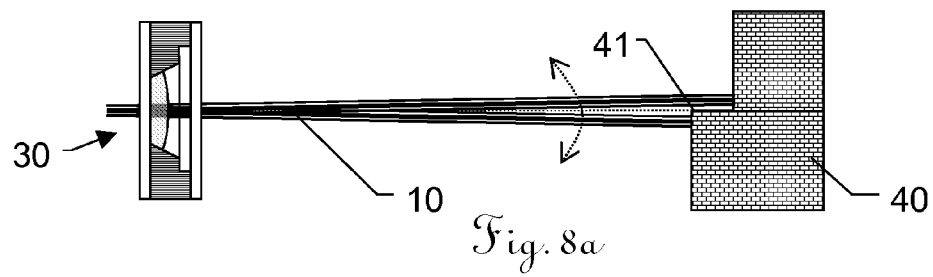
FIGS. 8a, 8b, 8c, 8d, 8e, 8f, 8g, 8h, and 8i show exemplary target line modifications in a surveying device according to the invention using liquid lens.

FIG. 8a shows a liquid lens 30, using which a beam path of a distance meter experiences a modification in the form of an angle deflection in relation to the target line. In the example shown, this is used to survey an edge 41 of a building as a target object 40, in that the distance measuring radiation is scanned back and forth in rapid sequence periodically over the edge 41, in order to detect it exactly. The edge 41 can be performed in a first step with the aid of image recognition in the field of vision of the device 11, for example, after which the above-described detailed surveying of the edge 41 occurs. The edge 41 can also additionally be scanned perpendicularly to the sheet plane, for example, with the aid of a servo-drive in the tilt axis goniometer 8 of the device 11. For example, it is possible to move by means of image processing automatically along the edge, while the distance measuring beam continuously scans the transverse profile of the edge.

Figure 8B:
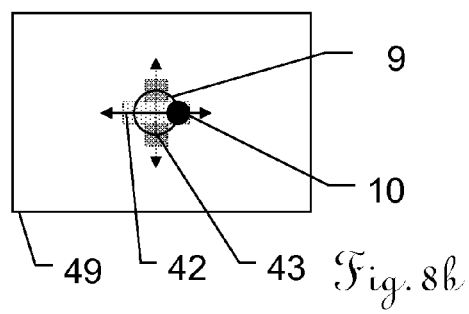

FIG. 8b shows an example of a modification of the beam path using the liquid lens 30, in which horizontal 42 and/or vertical 43 oscillating scanning is performed using an optical beam 10 of a distance meter in the region of the target axis 9 in the observation region 49 of the device 11.

Figure 8C:
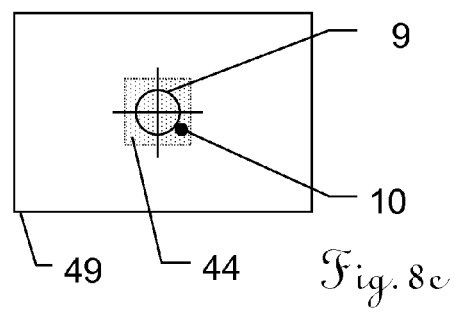

FIG. 8c shows an example of a modification of the beam path 10 performed using planar scanning of a region 44 in the direction of the target axis 9 in the field of vision 49 of the device 11. In addition to the distance to a surface to be surveyed as a target object, for example, also the inclination thereof in relation to the target axis 9 can be ascertained.

Figure 8D:
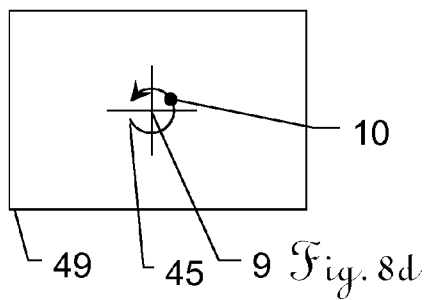

FIG. 8d shows an example of a modification of the beam path 10 using circular scanning 45 of a region around the actual target axis 9. At corresponding beam diameter of the measuring radiation 10 on the target object, which can also be modified according to the invention, the target axis 9 can also be circled around (not shown here). Therefore, for example, a corner to be surveyed as a target object can be characterized not only by image analysis, but rather also by the distance measuring, and these items of information can be used for the purpose of aligning the device 11 thereon. According to the invention, only the distance measuring beam can also be laterally displaced (still circling, or statically) in relation to the actual target axis 9, in order to survey the distance thereof more precisely (and reduce speckles), wherein the respective angle displacement of the target axis 9 in relation to the distance measuring beam can also be taken into consideration in the analysis.

Figure 8E:
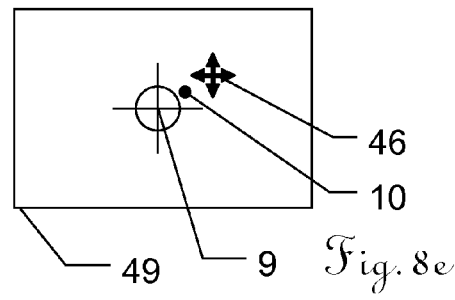

FIG. 8e shows an example of a displacement of the target direction of the measuring beam in relation to the target axis 9. Such a displacement can be intentionally introduced according to the present invention (for example, as already described further above). However, the displacement can also be a correction of an undesired device error, which is correctable according to the invention using a static target line modification.

A static target line modification can be performed using the liquid lens 30 according to the invention. That is to say, a deflection which remains unchanged over longer periods of time, i.e., multiple minutes, hours, or longer, or which only change slightly—i.e., by a few percent—in these periods of time. Such static target line modifications are used in the surveying device 11 equipped according to the invention, for example, to align and stabilize the target line 10 of the distance meter in relation to the target axis 9 of the device 11. Since the modification is possible according to the invention using the liquid lens 30 during the operation of the device 11, the requirements for the alignment during the device production and optionally also special measures in the device design for maintaining this alignment in the event of temperature changes, impacts, etc., can also be omitted. Using the liquid lens 30 according to the invention, which is configurable by means of multiple electrical activation signals in such a manner that the optical refraction properties thereof are differently variable in at least two or three (at least two transverse and one axial) non-coincident directions, a static target line modification for the target line stabilization can be carried out, which can also be calibrated in a simple manner in the field, for example. By way of means for visualizing the laser target line of the distance measurement (for example, visible measuring light, measuring light detectable by a camera within the device, fluorescent target surfaces, special position-sensitive sensors for the measuring light, etc.), such a calibration can be carried out—optionally even automatically. If the liquid lens 30 used according to the invention can have its optical properties changed with high reproducibility, an otherwise used feedback within the device of the current deflection (for example, by a dedicated sensor for this purpose or with utilization of a reflection within the device, in particular a parasitic reflection) can be omitted. Hysteresis effects often become quite small in any case, or can mostly be handled simply, in that the approach of the desired refraction properties can always occur from the same direction or even from the same starting position.

A further improvement of the instrument precision can be performed in that systematic drifts of the target line are surveyed in the production (for example, during a final test). For example, the incorrect targeting of the target line as a function of the temperature is parameterized or stored in a table by means of a spline. During the application of the instrument, the corresponding temperature correction is then applied to the target line together by means of a temperature sensor. The temperature sensor can be attached close to the liquid lens 30 to compensate for drifts of the liquid lens 30.

The static target line modification using the liquid lens 30 can be used, as described, to compensate for instrument errors, misalignments, etc. However, a displacement of the target line 10 can also be intentionally introduced. For example, the device-target axis 9 can only be aligned coarsely on the target object, the exact angular position of which is automatically recognized within the field of vision of the device 11 (image recognition, automatic detection of reflectors, etc.) or established by the user, for example, on a screen. The measuring beam of the distance measurement can then be deflected in this direction using the liquid lens 30, in order to exactly survey the target point, without the device-target axis 9 being aligned exactly on this target point. Similarly to lane tracking in a drive for optical data carriers, coarse positioning is thus performed using a servomotor (or in the case of surveying devices optionally also by hand), in combination with a fine alignment of the actual measurement by the optics, in the present invention especially by the liquid lens according to the invention.

FIG. 8e especially shows a field of vision 49 of the device 11, having its target axis 9. In the field of vision 49, the point of incidence of the laser radiation 10 of the distance meter of the surveying device 11, which can be displaced as described above using the liquid lens, is located, which is symbolized by the crossed arrows 46. The liquid lens can thus perform a static stabilization—i.e., bringing the point 10 into correspondence with the target axis 9—or a controlled deflection from this alignment.

Figure 8F:
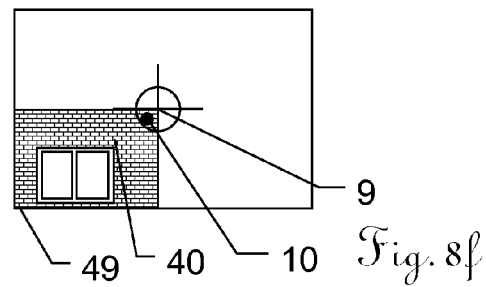

FIG. 8f shows an example of surveying in which a non-coincidence of the target axis 9 in relation to the direction of the distance measurement is used. The target object 40 is the corner of a building, which is aimed at using the target axis 9 represented by the crosshairs for the angle surveying. To carry out the distance measurement, in the case of a concentric distance measurement, a substantial proportion of the measuring radiation would be lost adjacent to the edge or would hit a different target than that to be surveyed and would result in ambiguity. Due to the displacement shown of the target point of the distance measurement into the bottom left square of the target object 40, all of the measuring radiation can be oriented on the target object and used for the surveying. In a refinement, a superposition of the above-described scanning movement can be used to that effect to determine an inclination of the measured surface in relation to the optical axis and therefore to mathematically compensate for any possible measuring errors via the displaced measuring point by means of this inclination. Surveying of an edge or step can also be performed by targeting a corner using the crosshairs of the target axis 9 and performing multiple distance measurements in the four squares around the crosshairs.

Figure 8G:
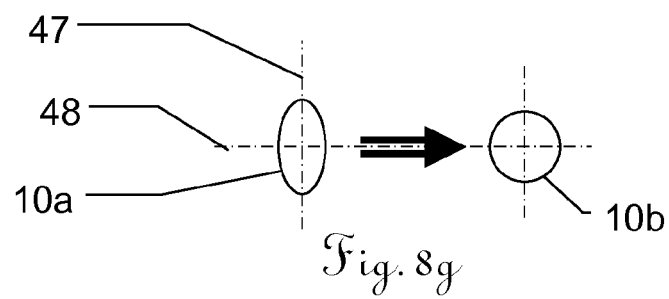

FIG. 8g shows an example of a compensation according to the invention of different divergence angles of a laser beam emitted from a semiconductor light source (as an elliptical beam bundle), which is used as optical radiation for surveying purposes in a surveying device 11 according to the invention. With the liquid lens used according to the invention in the surveying device, a beam modification can be performed to modify or compensate for the beam divergence depending on the axis.

The liquid lens has for this purpose a liquid, which is transparent in the wavelength range of the optical signal, having at least one interface toward a medium having an optical index of refraction deviating from the liquid. The adjacent medium can in turn be a liquid or also air, however, for example. The interface can be deformable by means of multiple electrical activation signals in such a manner that the optical refraction properties of the element are thus differently variable in at least two non-coincident directions. Therefore, for example, setting the size of the measuring radiation point of incidence can be achieved over the entire measuring range of the surveying device, wherein the shape of the point of incidence, i.e., the measuring light spot can be adjusted in its shape, for example, as a circle, ellipsoid, etc., in accordance with a specification. Thus, for example, if the beam shaping at the point of incidence is to be imaged or projected without astigmatism, preferably at least two liquid lenses are used successively, whereby the enlargement can be set like a zoom in multiple directions.

Figure 8H:
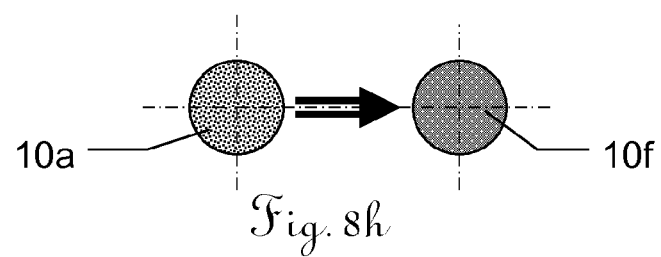

FIG. 8h shows an example of a compensation according to the invention of speckles in an ATR or measuring beam or an adaptation of the modulation wavefront of the optical radiation emitted by the device 11. The liquid lens can be activated into, for example, a cyclic variation of its refraction properties, which results in wiping of speckle effects. This variation can be quite slight in its amplitude for this purpose, but is performed in particular at greater frequency, in particular having amplitude which is sufficient for blurring the speckles and a frequency which is sufficiently rapid for averaging speckles during one measurement or measured over multiple measurements, which are averaged for the measured value formation.

Figure 8I:
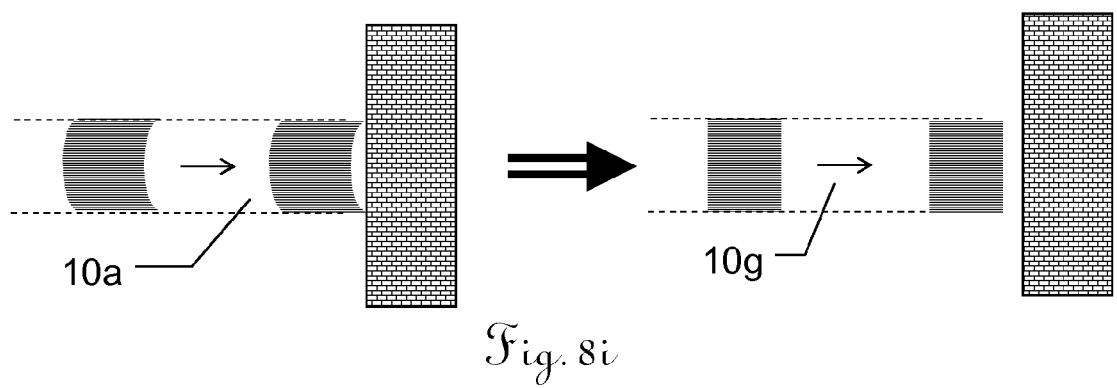

FIG. 8*i* shows an adaptation of the modulation wavefront of the intensity of the emitted radiation as a further example of a target line modification according to the present invention. Optoelectronic devices such as distance meters, ATR, or target search units operate using chronologically modulated transmitted beams. The measurement precision of such a measuring device is influenced, inter alia, by the flatness or uniformity of the modulation wavefront of the radiation 10 used. The liquid lens 30 can serve for the adaptation of the modulation wavefront of the emitted measuring radiation. In particular, multi-segment activators of the liquid lens can be used, to achieve a smooth modulation wavefront of the emitted optical radiation at the target object, or to bring the modulation wavefront into a different desired, for example, flat form, by way of corresponding deformations of the interface of the liquid. In addition to static smoothing of the modulation wavefront, dynamic smoothing thereof can also be performed, wherein the improvement of the measurement precision occurs as a result of a chronological averaging. Especially in the case of the ATR, the presence of speckles interferes with the direction measurement. Chronological averaging of the speckles can be achieved by dynamic activation of the liquid lens, and therefore the angle precision of the ATR measurement precision can be substantially improved.

Figure 9:
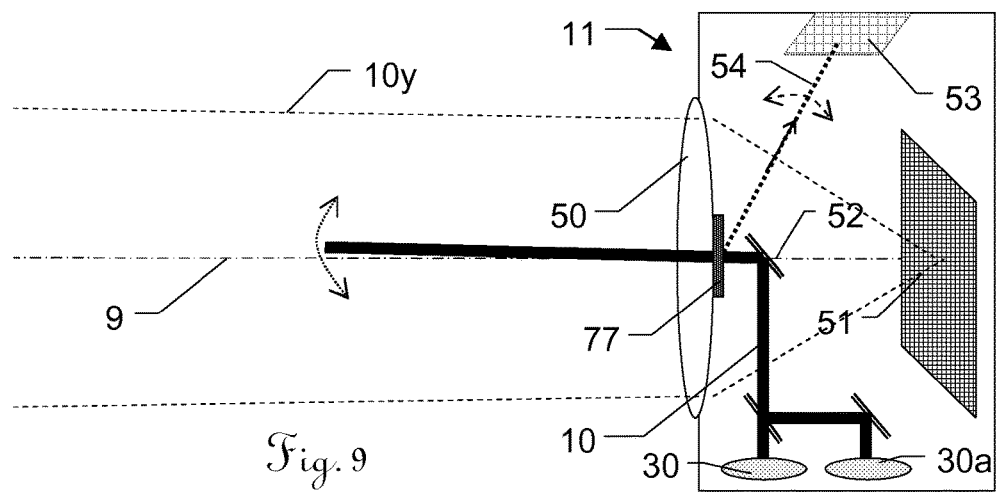
FIG. 9 shows an exemplary schematic view of a first target line modification using a liquid lens according to the present invention.

An exemplary view of a surveying device 11 according to the invention having a liquid lens 30 is shown in FIG. 9 in a simplified schematic view of several, partially also optional device components. The optical radiation 10 emitted by the device 11 is emitted by coaxial reflection of the radiation 10 with the reception beam path of the reception lens 50 having a target axis 9 of an observation of the target object 40 for the angle measurement. A component of the emitted radiation reflected from the target object is detected by the input optic 50 and conducted onto a receiving element (not shown here) of the optoelectronic distance meter. The target line modification of the optical radiation 10 is performed by the liquid lens 30 within the device, indicated here by the base arrows. However, in addition to a target line displacement, another of the target line modifications described here or in particular a combination thereof can also be carried out by means of the liquid lens. A planar image sensor 51 (for example, a CCD or CMOS camera) is also shown in the view, using which the target object can be visualized. Optionally, a target illuminator associated with the planar image sensor can also be equipped with a liquid lens 30*a*, a typical target line modification is a distance-dependent divergence setting, for example. Furthermore, a transparent channel, a target illuminator, an optical position-sensitive element for target detection, automatic targeting, and/or target tracking, a reference path for the distance measurement, additional image recognition elements, and greatly varying optical element such as lenses, deflection mirrors, prisms, wavelength filters, polarizers, etc. can be provided, which are not shown here for the sake of clarity.

In contrast, an example of an optional detection within the device of the current beam modification of the emitted optical radiation is shown shaded. The example shown uses a parasitic internal reflection 54 of the radiation to be emitted in the interior of the device 11, which is received by a photosensitive element 53, or deflected thereon. The photosensitive element 53 can be, for example, a PSD, one or more photodiodes, or a CCD or CMOS array. Alternatively, in addition to the above-described parasitic reflection, branching off of a component of the radiation especially installed for this purpose can also be used. For example, by means of a hologram 77, a fraction of the radiation can be reflected and deflected at a specific angle in such a manner that it is supplied to the position-sensitive element.

Figure 10:
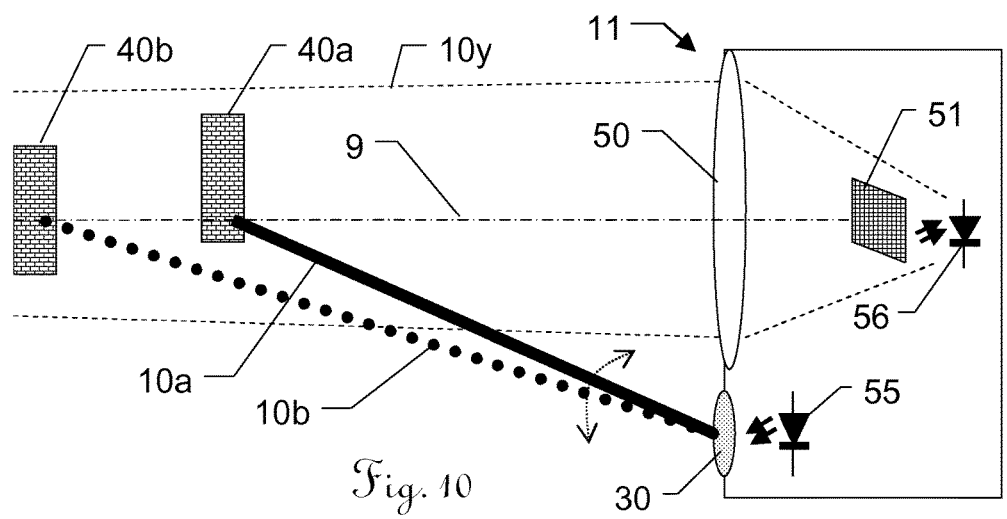
FIG. 10 shows an exemplary schematic view of a second target line modification using a liquid lens according to the present invention.

FIG. 10 shows a special case in which the emission of optical distance measuring radiation occurs biaxially to the target axis direction 9 of the device 11. The optical axes of the transmission beam path of the distance measurement 10*a*, 10*b* thus clearly deviate from the reception beam path of the objective lens 50 having the target axis 9, for example, in that—as shown—dedicated optics arranged adjacent to one another are respectively used for this purpose. Alternatively to the embodiment shown, the reception beam path can also be equipped with liquid lens 30 and the transmission beam path can be equipped without liquid lens 30, wherein in this special case, the target axis may alternatively be defined via the transmission beam path, whereby the significance of the terms target line and target access would be applied transposed in relation to their use in this description. With the liquid lens 30 used according to the invention in the surveying device 11 having an optically transparent liquid, which has at least one interface toward a medium having an optical index of refraction deviating from the liquid, which is deformable by means of multiple electrical activation signals in such a manner that thus the optical refraction properties of the liquid lens 30 are differently variable in at least two non-coincident directions, a point of incidence of the measuring radiation on the target object 40 can also be set in the case of such a non-coaxial system, this point of incidence coming to rest independently of distance on the axis of the target direction. Thus, in the case of a close target object 40 and also in the case of a more remote target object 40*b*, it is always measured in the target axis direction 9, which is achievable by a target line modification using the liquid lens 30 in the surveying device 11, in that the direction of the optical axis of the emission is varied from 10*a* to 10*b*, for example. Therefore, the point of incidence of the radiation emitted by the distance measuring light source 55 always lies on the device target axis 9 and the distance ascertained by analyzing the distance measuring light receiver 56 is always defined, in spite of biaxial arrangement of the transmitter, at a point which lies on the target axis 9. As a further target line modification, for example, the collimation of the measuring radiation can additionally be adapted, to achieve a desired light spot on the target object respectively at different target distances. The controlled static or dynamic deflection of the distance measuring point from the target axis 9, which is described in this document, can also additionally be applied as a further example of a target line modification.

Optionally, during the distance determination, the angle deflection caused by the liquid lens 30 can also be taken into consideration, which would especially corrupt the distance measuring results in the case of close targets due to the triangle formation. The point of incidence of the measuring radiation can be determined, for example, by a light-position-sensitive element 51 (for example, a camera) and the deflection can be adapted by the liquid lens 30 on the basis thereof. Problems of adjacent region shadowing can also be overcome by the liquid lens 30 in a surveying device 11 according to the invention.

Figure 11:
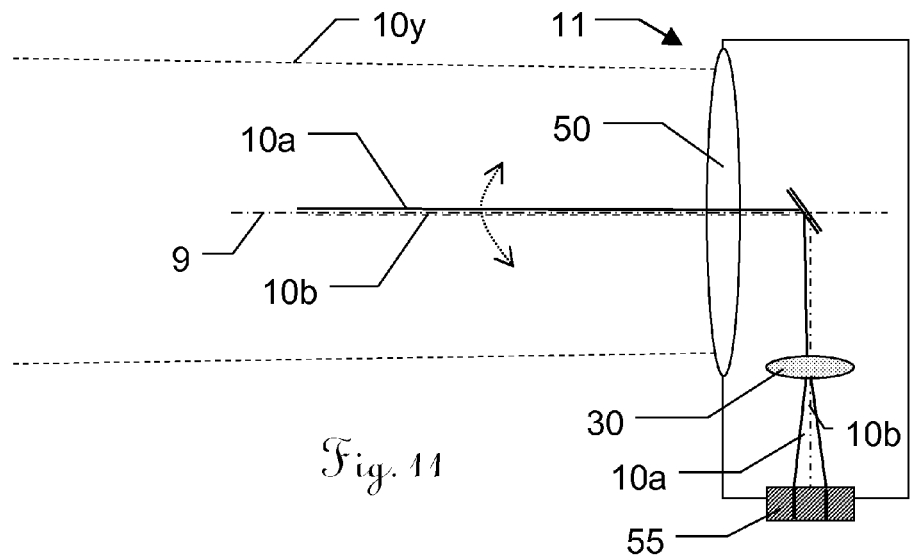
FIG. 11 shows an exemplary schematic view of a third target line modification using a liquid lens according to the present invention.

FIG. 11 shows an exemplary target line modification, in which optical distance measuring radiation of the light source 55a of the distance meter is varied using the liquid lens 30. The light source 55a is a laser diode component, which can emit different wavelengths 10a and 10b, for example, infrared and/or visible red. Such components are available on the market, however, the radiation of the two wavelengths is emitted at different points and/or the beam bundles have different divergences, which are additionally usually also subjected to exemplary scattering. Using the target line modification by the liquid lens 30 according to the present invention, such a component can be used in a surveying device, since in this way possible deviating emission parameters of the laser light source 55a, but also chromatic aberrations of the transmission optic, can be corrected by means of the liquid lens and an alignment of the laser target line on the target axis is executable (or intentionally deviating therefrom, as described). Therefore, for example, measurements on retroreflectors can be carried out using nonvisible IR radiation and reflector-free measurements can be carried out using a visible measuring point, and target line 10 and target axis 9 can be aligned with one another. Any possible calibration thereof can be performed automatically and also in the field, without mechanical interventions by the user being necessary. A known phenomenon in laser diodes is the thermal drift of their emission wavelength. Upon use of simple and cost-effective collimation optics having chromatic longitudinal aberration, the quarter-wave condition can be maintained by means of a liquid lens and a temperature measurement on the laser diode, so that the laser spot sharpness on the target object 40 is also maintained in the event of thermal drift of its emission wavelength.

Figure 12:
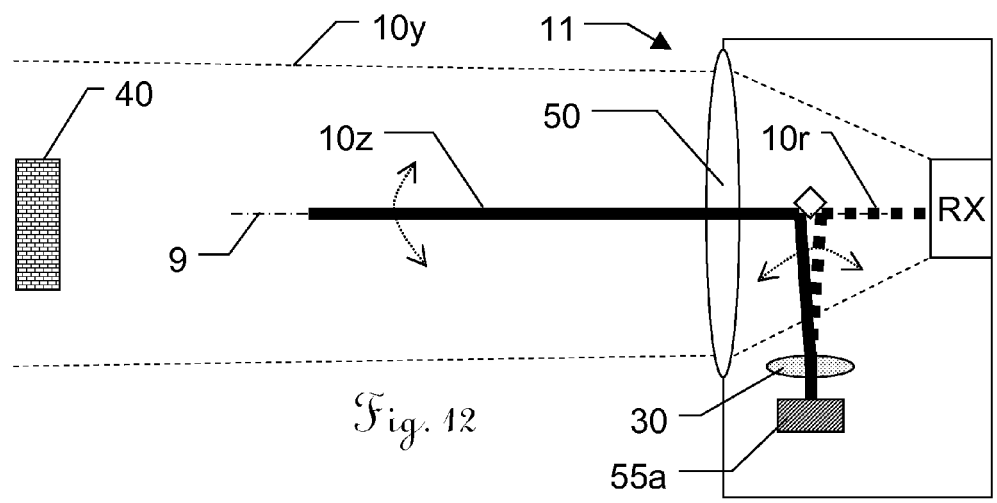
FIG. 12 shows an exemplary schematic view of a fourth target line modification using a liquid lens according to the present invention.

FIG. 12 shows an exemplary target line modification, in which, using the liquid lens 30, distance measuring radiation of the light source 55a of a distance meter is transmitted either in the form of radiation 10z emitted from the device 11 in the direction of the target object 40 or is conducted in the form of reference radiation 10r within the device via a reference section of known length directly onto a receiver RX for the distance measuring radiation. Optionally to this function, using the liquid lens 30, an alignment of the target line 10z of the distance meter in relation to the target axis 9 of the device 11 can also be varied and/or a beam divergence of the emitted radiation 10z can be varied. Others of the target line modifications by the liquid lens 30 described in this document are also applicable.

Figure 13A:
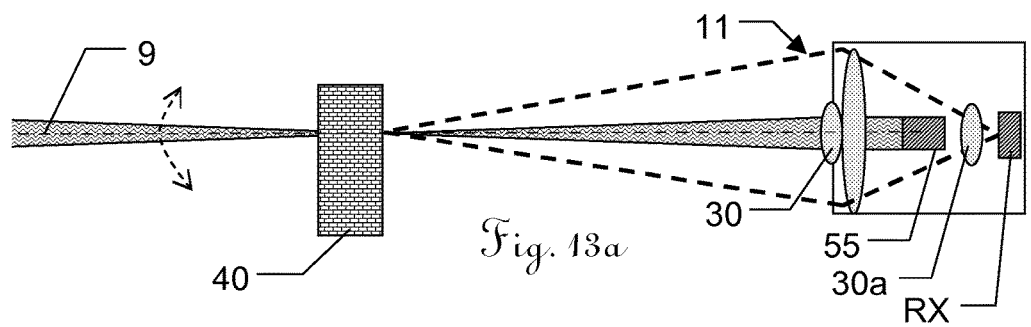
FIGS. 13a, 13b, and 13c show examples of target line adaptations during surveying tasks using a surveying device according to the invention having a liquid lens.

FIG. 13a shows, in greatly simplified form a surveying device 11 having the transmission beam path of the distance meter installed therein. A laser source emits amplitude-modulated optical radiation for distance measurement, which is modified according to the invention by the liquid lens 30. To achieve point-precise measurement and also ensure good visibility of the measuring point on the target object 40, the distance measuring radiation is modified in such a manner that its beam waist at least approximately comes to rest on the target object 40. To set this, for example, the result of a first distance measurement can be used.

A liquid lens 30a can also be placed in front of the receiver RX. In particular in the case of short measuring distances, avoidance of near field shading can be caused by adapting the geometry of the distance measuring beam path using the liquid lens 30a. The object 40 can be imaged on the receiver RX at least approximately at all distances by means of the liquid lens 30a.

Figure 13B:
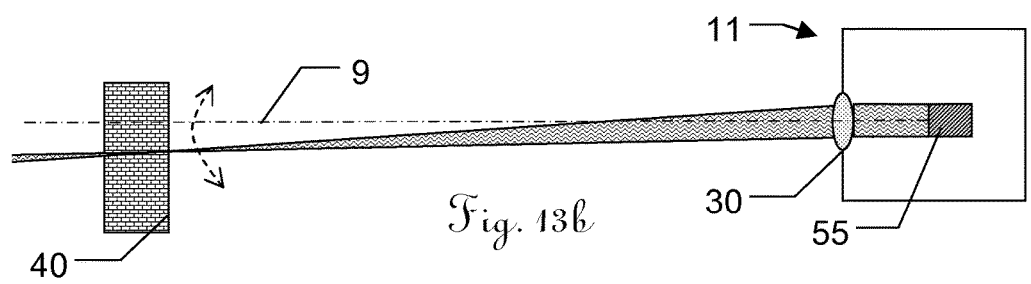

FIG. 13b shows the state of affairs of FIG. 13a during the surveying of a more remote target object 40, wherein in addition a deviation of the target line 10z of the distance meter from the target axis 9 of the device 11 is visible. Using the liquid lens 30, in this example, the measuring light is in turn focused in the region of the target object 40 and/or the offset of the two target directions is compensated for or a possibly desired offset is introduced, respectively, or a dynamic scanning movement is introduced, beam divergence adaptations, speckle reductions, wavefront adaptations, etc. are performed—in short a combination of a selection of the target line modifications described in this document, wherein the concrete selection results from the measurement requirements.

Figure 13C:
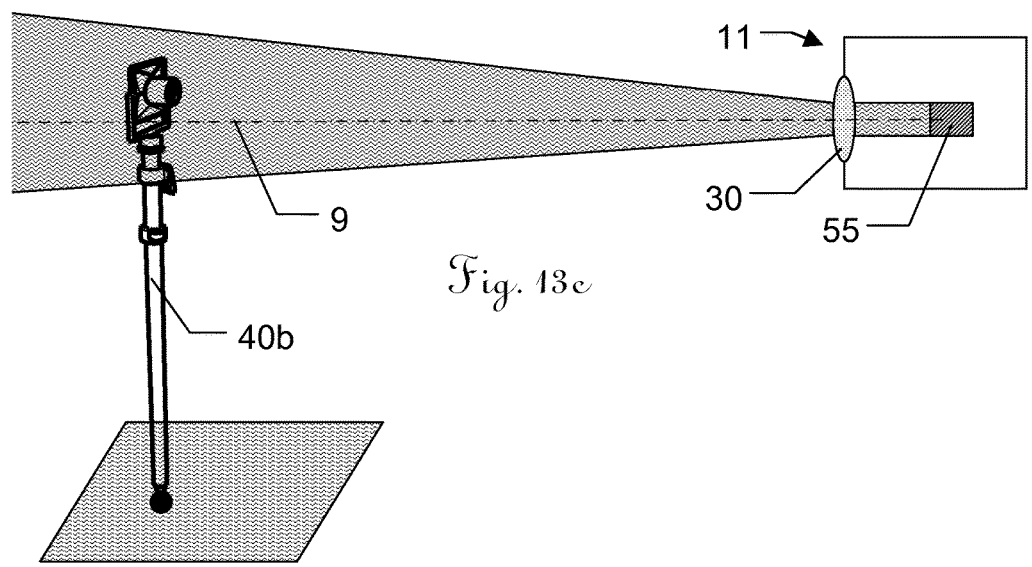

FIG. 13c shows the surveying device according to the invention from the previous two figures during surveying of a well-reflecting, cooperative target, such as the retroreflector shown on the surveying stick 40b as a target object. Since the target object reflects well, the measuring radiation can be emitted significantly more divergent in this case using the liquid lens, without the distance measurement precision thus being worsened due to excessively low signal intensity. This wide, strongly divergent measuring beam 10z can also be used, for example, for automatic recognition of the target in the field of vision of an ATR of the device 11, using which the angular position of the target object 40 can also be automatically determined. To reduce the speckle effects, which have an interfering effect during the precise target finding, one of the above-described methods can additionally be applied for this purpose. In one embodiment, for example, the divergence of the measuring beams 10z can be set as a function of the measuring distance, wherein the divergence angle decreases with increasing measuring distance. Therefore, the irradiance at the surveying stick or at the surveyor staff only decreases slightly with increasing distance, whereby the reception signal of the measuring devices remain sufficiently strong and the measurement precision is improved.

Figures 14A, 14B:
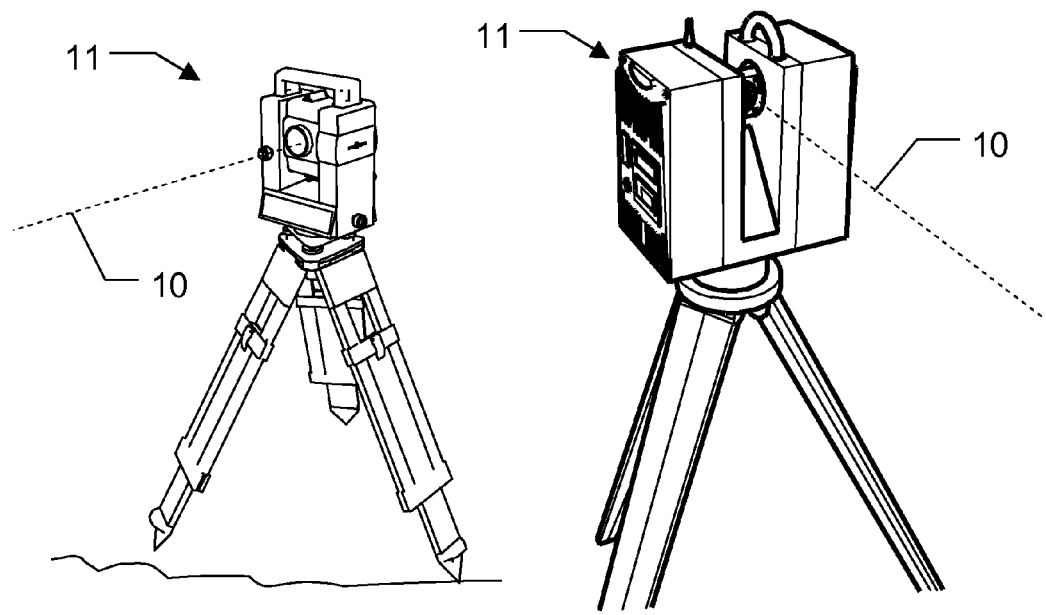
FIGS. 14a, 14b, and 14c show further examples of embodiments of surveying devices according to the invention having liquid lenses for target line modification.
Figure 14C:
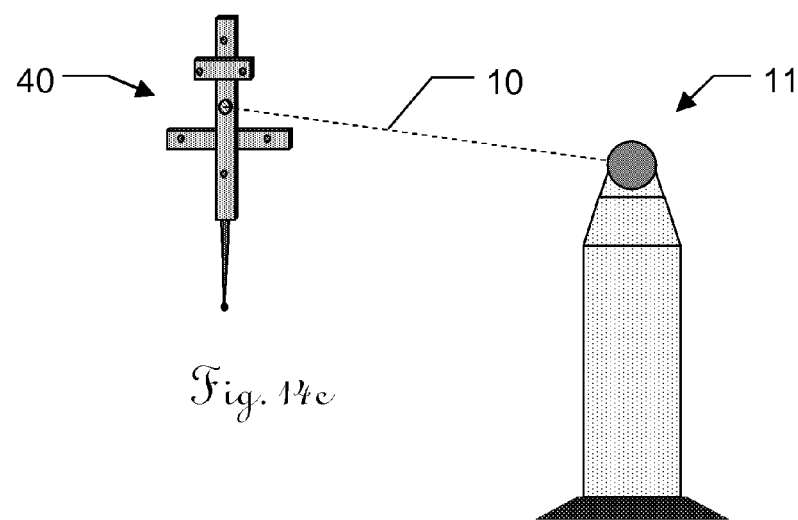

FIG. 14a, FIG. 14b, and FIG. 14c show examples of several further embodiments of surveying devices, which are equipped according to the invention with a liquid lens, so that the above-described target line modifications can be carried out using them. Concretely, these are surveying devices which determine polar coordinates of target points on target objects using a target line, which is movable about two axes, of an optoelectronic distance meter. Especially, a tachymeter or a total station is shown in FIG. 14a, a laser scanner is shown in FIG. 14b, and a laser tracker is shown in FIG. 14c.

It is apparent to a person skilled in the art that the beam paths shown here are schematic in nature and additional optical components and geometric conditions between them can correspondingly be necessary in the case of practical implementations, to achieve the described functionalities in the design of a device 11.

According to the invention, the optical element 30 in the surveying device 11 is thus implemented and arranged in such a manner that in using it, for example, a target line modification can be carried out in the form of aligning a target line in relation to the target axis 9 of the surveying device 11, varying a divergence of the emitted radiation, in particular direction-dependent variation, reducing speckle effects by dynamic variation of the refraction properties, smoothing a modulation wavefront, executing dynamic scanning movements of the first beam path 10z, switching over between a reference beam path or a measuring beam path, aligning at least beam paths of two different optical radiation sources in relation to one another, and/or tracking the target object 40 using the first and/or second beam path alone or in combination with one another.

What is claimed is:

1. An optical surveying device comprising:
   a base for setting up the optical surveying device and a targeting unit, which is rotatable in relation to the base about two axes, which are each provided with angle meters, this targeting unit defining a target axis for targeting a target object to be surveyed, wherein the targeting unit includes
   a first beam path for emitting optical measurement radiation, from a laser light source, in a direction of the target object to be surveyed, and
   a second beam path for receiving a component of the optical measurement radiation, which is reflected from the target object, by way of an optoelectronic receiving element,
   wherein at least one of the beam paths has an optical element, which is implemented at least having an optically transparent, deformable volume body, which has at least one interface toward a medium having an optical index of refraction deviating from the volume body,
   wherein the interface is deformable by means of multiple electrical activation signals in such a manner that optical refraction properties of the optical element are differently variable in at least two non-coincident directions, wherein the directions are about orthogonal to an optical axis of the optical element, especially wherein the optical element is a liquid lens, and
   wherein the optical surveying device is configured to perform a method of modifying the first and/or second beam path by performing a target line modification with the differently variable optical refraction properties of the optical element, comprising at least one of:
   aligning a target line in relation to the target axis of the surveying device;
   reducing speckle effects of the optical measurement radiation by dynamic variation of the refraction properties;
   smoothing a modulation wavefront of the optical measurement radiation;
   executing dynamic scanning movements of the first beam path;
   switching over between a reference beam path and a measuring beam path;
   aligning beam paths of at least two different optical measurement radiation sources in relation to one another, wherein one of the optical measurement radiation sources is the laser light source corresponding to the first beam path; and/or
   tracking the target object using a the first and/or the second beam path.

2. The surveying device according to claim 1, wherein the optical element has multiple final control elements, which are activated by the electrical activation signals of at least four along the circumference of the volume body.

3. The surveying device according to claim 1, wherein the optical element is implemented in such a manner that its optical refraction properties are variable in such a manner that a variation of a deflection of the optical axis of the relevant beam path can be carried out by the electrical activation signals, wherein the optical signal can be switched over between a reference path and a measuring path using the variation of the deflection.

4. The surveying device according to claim 1, wherein the optical element is implemented in such a manner that its optical refraction properties are variable in such a manner that a variation of an axial focusing of the relevant beam path can be carried out by the electrical activation signals, wherein the focusing is variable between divergent and convergent.

5. The surveying device according to claim 1, wherein the surveying device has an optoelectronic distance meter and the beam path having the optical element guides optical measurement radiation from the distance meter.

6. The surveying device according to claim 1, wherein the optical element is arranged in the first beam path and a static and/or dynamic target line modification can be carried out with the variation of the optical refraction properties, wherein the target axis can be calibrated in its alignment using the static target line modification.

7. The surveying device according to claim 1, further comprising: an optical sensor element for a recognition of a point of incidence of the optical measurement radiation on the target object; and wherein a regulation of the electrical activation signals is performed by an analysis of the optical sensor element in such a manner that a shape and/or a location of the point of incidence in relation to the target axis corresponds to a setpoint value.

8. The optical surveying device according to claim 1, wherein the optical surveying device comprises a tachymeter, laser scanner, or laser tracker.

9. The optical surveying device according to claim 1, wherein the optically transparent deformable volume body comprises a liquid.

10. The optical surveying device according to claim 1, wherein a varying of a divergence of the emitted measurement radiation comprises a direction-dependent variation of the divergence of the emitted measurement radiation for the target line modification.

11. The surveying device according to claim 1, wherein the surveying device has automatic target detection and the beam path having the optical element guides optical measurement radiation from the target detection.

12. A method for surveying a target object using an optical surveying device, the method comprising:
   setting up a base of the device;
   targeting the target object using a target axis of a targeting unit by rotating the targeting unit about two axes, which are provided with angle meters, in relation to the base;
   emitting of optical measurement radiation along a first beam path in the direction of the target object; and
   receiving a fraction of the optical measurement radiation, which is reflected from the target object along a second beam path, by way of an optoelectronic receiving element;
   wherein a target line modification of the first and/or second beam path using a variation of optical refraction properties of an optical element, which is located in at least one of the beam paths, in at least two non-coincident directions, which is performed by different deformation of an interface of an optically transparent deformable volume body toward a medium having an optical index of refraction deviating from the volume body, in the directions, and is controlled by means of multiple electrical activation signals, and wherein the modification comprises at least one of:

aligning a target line in relation to the target axis of the optical surveying device;

reducing speckle effects of the optical measurement radiation by dynamic variation of the optical refraction properties;

smoothing a modulation wavefront of the optical measurement radiation;

executing dynamic scanning movements of the first beam path;

switching over between a reference beam path and a measuring beam path;

aligning beam paths of at least two different optical measurement radiation sources in relation to one another, wherein one of the optical measurement radiation sources is the laser light source corresponding to the first beam path; and/or tracking the target object using the first and/or the second beam path.

13. The method according to claim 12, wherein the modification is performed as a static target line modification in the form of a direction-dependent beam bundle shaping of direction-dependent different divergence angles of the emitted optical measurement radiation.

14. The method according to claim 12, wherein the emission of the optical measurement radiation is performed using at least two wavelengths with which the at least two wavelengths are emitted by a single component, and the modification as a static target line modification aligns the optical measurement radiation of one or both of the at least two wavelengths in relation to the target axis.

15. The method according to claim 14, wherein the at least two wavelengths comprise one visible wavelength and one nonvisible wavelength, especially using a laser light source.

16. The method according to claim 12, wherein the modification is performed as a static target line modification in such a manner that a distance-adapted focusing of the beam path containing the optical element is performed, having a first beam divergence for a noncooperative target object, which is less than a second beam divergence for a cooperative target object.

17. The method according to claim 12, that an adaptation of the focusing of the beam path containing the optical element is performed, so that an irradiance of the optoelectronic receiving element is kept at least approximately constant.

18. The method according to claim 12, wherein the modification is performed as a dynamic target line modification having dynamic variation of the refraction properties, reduction of speckle effects of the optical measurement radiation, and/or smoothing of a modulation wavefront of the optical measurement radiation, having a periodic variation of the refraction properties and/or, in that the modification is performed as a dynamic target line modification having a scanning movement of the beam path in a region about a setpoint target direction to the target object, having an ascertainment of an edge of the target object or an inclination of a surface of the target object in relation to the setpoint target direction by surveying multiple points within the scanning movement, or the modification is performed as a dynamic target line modification synchronously to a movement of at least one of the axes, wherein the beam path is modified in such a manner that this is aligned by a static receiving aperture on the optoelectronic receiving element.

19. A non-transitory computer program product having program code which is stored on a machine-readable carrier, or a computer data signal, embodied by an electromagnetic wave, for carrying out the method according to claim 12.

* * * * *